United States Patent [19]

M. Cheng et al.

[11] Patent Number: 5,551,031

[45] Date of Patent: Aug. 27, 1996

[54] PROGRAM STORAGE DEVICE AND COMPUTER PROGRAM PRODUCT FOR OUTER JOIN OPERATIONS USING RESPONSIBILITY REGIONS ASSIGNED TO INNER TABLES IN A RELATIONAL DATABASE

[75] Inventors: Josephine M. Cheng; Chandrasekaran Mohan; Mir H. Pirahesh, all of San Jose, Calif.

[73] Assignee: International Business Machines Corporation, Armonk, N.Y.

[21] Appl. No.: 487,300

[22] Filed: Jun. 7, 1995

Related U.S. Application Data

[62] Division of Ser. No. 325,942, Oct. 19, 1994, which is a continuation of Ser. No. 749,088, Aug. 23, 1991, abandoned.

[51] Int. Cl.$^6$ .................................................. G06F 17/30
[52] U.S. Cl. ................. 395/600; 364/282.1; 364/DIG. 1
[58] Field of Search ........................ 364/DIG. 1, DIG. 2; 395/600

[56] References Cited

U.S. PATENT DOCUMENTS

| | | | |
|---|---|---|---|
| 4,497,039 | 1/1985 | Kitakami et al. | 395/600 |
| 4,506,326 | 3/1985 | Shaw et al. | 395/700 |
| 4,967,341 | 10/1990 | Yamamoto et al. | 395/600 |
| 5,043,872 | 8/1991 | Cheng et al. | 395/600 |
| 5,210,870 | 5/1993 | Baum et al. | 395/600 |

FOREIGN PATENT DOCUMENTS

| | | |
|---|---|---|
| A0421408 | 4/1991 | European Pat. Off. |
| 59-125461 | 7/1984 | Japan ................. G06F 13/00 |

OTHER PUBLICATIONS

Jajodia, S. et al. "Lossless Outer Joins of Relations Containing Nulls." in: Proceedings of the Nineteenth Hawaii International Conference on System Sciences 1986 (vol. 2:Software), pp. 388–394.

Hurson, A. R. et al. "Incomplete Information and the Join Operation in Database Machines." in: Proceedings of the 1987 Fall Joint Computer Conference Exploring Technology: Today and Tomorrow, pp. 436–443.

Jajodia, S. et al. "Lossless Outer Joins with Incomplete Information BIT," vol. 30, No. 1 (1990), pp. 34–41.

Segey, A. et al. "Event–Join Optimization in Temporal Relational Databases." in: Proceedings of the Fifteenth International Conference on Very Large Data Bases (22–25 Aug. 1989), pp. 205–215.

Date, C. J. "Watch Out for Outer Join." INFO DB, vol. 5, No. 1 (Spring–Summer 1990), pp. 30–38.

(List continued on next page.)

*Primary Examiner*—Thomas G. Black
*Assistant Examiner*—Maria N. Von Buhr
*Attorney, Agent, or Firm*—Sterne, Kessler, Goldstein, & Fox, P.L.L.C.; Marilyn Smith Dawkins

[57] ABSTRACT

A computer database system utilizes a method for performing a right outer join of database tables without sorting the inner table ($T_2$). The processing of each tuple in the outer table ($T_1$) includes the preservation in the joint output of all tuples in $T_2$ which are in its responsibility region. The initialization step of the process preserves in the join output all of the tuples in $T_2$ which have column set values less than the lowest column set value in $T_1$, i.e. the first tuple in $T_1$, since $T_1$ is sorted or accessed using a sorted index. The responsibility region for tuples in $T_1$, other than the last tuple, is defined as those tuples which have column set values less than the column set value for the next tuple in $T_1$ and greater than or equal to the column set value for the current $T_1$ tuple. The last tuple in $T_1$ must preserve all of the tuples in $T_2$ which have not already been preserved in $T_2$, i.e. all tuples greater than or equal to its column set value. If $T_1$ has duplicate values for the column set value, only the last one preserves the associated $T_2$ tuples. Additional methods for parallel execution of the outer join methods and methods for applying the outer join methods to subqueries (i.e., an All (or universal) Right Join (ARJOIN) and an Existential Right Join (ERJOIN)) are described.

22 Claims, 10 Drawing Sheets

OTHER PUBLICATIONS

Darwen, H. "Outer Join with No Nulls and Fewer Tears." INFO DB, vol. 5, No. 1 (Spring–Summer 1990), pp. 39–41.

Lee, Y. H. et al. "Adaptive Selection of Access Path and Join Method." in: Proceedings of the Thirteenth Annual International Computer Software and Applications Conference (1989), pp. 250–256.

Chen, A. L. P. "Outerjoin Optimization in Multidatabase Systems." in: Proceedings of the Second International Symposium on Databases in Parallel and Distributed Systems (1990), pp. 211–218.

Perrizo, W. et al. "Domain Vector Accelerator (DVA): A Query Accelerator for Relational Operations." in: Proceedings of the Seventh International Conference on Data Engineering (1991), pp. 491–498.

Cheng, J. et al. "An Efficient Hybrid Join Algorithm: A DB2 Prototype." in: Proceedings of the Seventh International Conference on Data Engineering (1991), pp. 171–180.

David, M. "Ins & Outs of Outer Joins." Database Programming and Design, vol. 3, No. 2 (Feb. 1990), pp. 35–43.

"A Formal Definition of the Relational Model," C. Date et al., ACM Record, 13(1), 1982.

"Extending the Algebraic Framework of Query Processing to Handle Outerjoins," D. Reiner et al., Proc. 10th Internat'l. Conf. on Very Large Data Bases, Singapore, Aug. 1984.

Bullers, William I., Jr., "A Processing Algorithm For Master–Detail Records In A Relational Database," *Software Practice & Experience,* vol. 17, No. 10, Oct., 1987, Great Britain, pp. 701–717.

Chang et al., "Performance Evaluation of the Hybrid Join," *The Transactions of the Institute of Electronics, Information and Comm. Engineers,* Aug. 1990, vol. E73, No. 8, Tokyo, Japan, pp. 1351–1360.

FIG. 3

TABLE 1

| WIRE | 10 |
|---|---|
| MAGNETS | 10 |
| PLASTIC | 30 |
| OIL | 160 |
| BLADES | 205 |

TABLE 2

| PRODUCT | PRICE | PROD# | TUPLE NO. |
|---|---|---|---|
| HAMMER | 7.00 | 505 | 1 |
| RELAY | 8.95 | 10 | 2 |
| SAW | 17.00 | 30 | 3 |
| DRILL | 35.00 | 160 | 4 |
| ROUTER | 99.00 | 205 | 5 |
| SCREWS | 19.00 | 2 | 6 |
| NAILS | 19.00 | 900 | 7 |

| j | PART | PROD # | REPONSIBILITY REGION | TABLE 2 TUPLES |
|---|---|---|---|---|
| 0 |  |  | $\geq -\infty$ AND $< 10$ | 6 |
| 1 | WIRE | 10 | $= 10$ (NULL RESP. REGION) | 2 |
| 2 | MAGNETS | 10 | $\geq 10$ AND $< 30$ | 2 |
| 3 | PLASTIC | 30 | $\geq 30$ AND $< 160$ | 3 |
| 4 | OIL | 160 | $\geq 160$ AND $< 205$ | 4 |
| 5 | BODIES | 205 | $\geq 205$ AND $< \infty$ | 1,5,7 |

CACHING TECHNIQUE
TABLE 2

FIG. 6  SPECIALIZED METHOD 2 SEQUENTIAL VERSION TABLE 3

ERJOIN VERSION OF SPECIALIZED METHOD 1
TABLE 4

ERJOIN VERSION OF SPECIALIZED METHOD 2
TABLE 4

ARJOIN VERSION OF SPECIALIZED METHOD 2

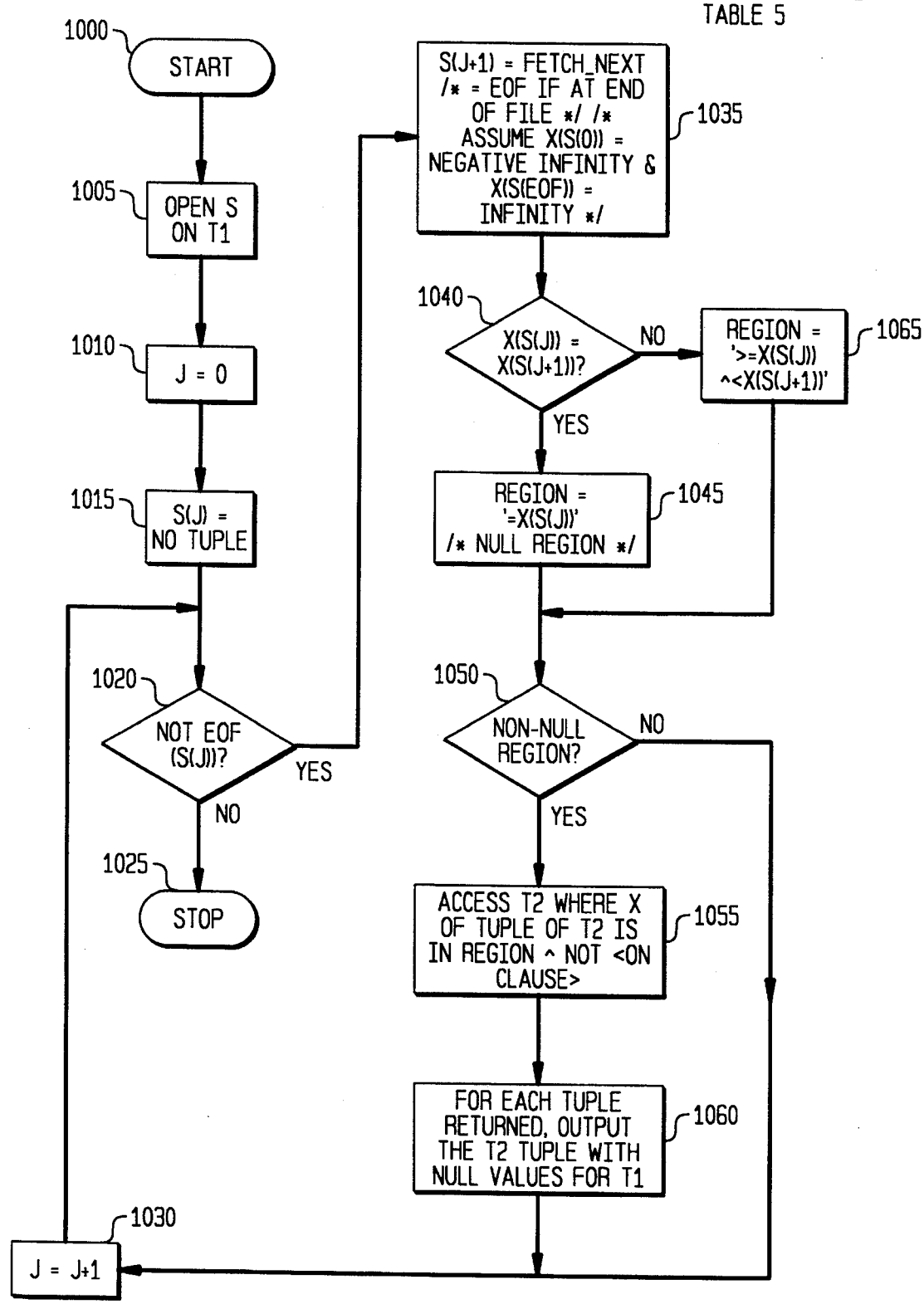

PROGRAM STORAGE DEVICE AND COMPUTER PROGRAM PRODUCT FOR OUTER JOIN OPERATIONS USING RESPONSIBILITY REGIONS ASSIGNED TO INNER TABLES IN A RELATIONAL DATABASE

This application is a division of application Ser. No. 08/325,942 filed Oct. 19, 1994, pending which is a File Wrapper Continuation of application Ser. No. 07/749,088 filed Aug. 23, 1991, now abandoned.

TECHNICAL FIELD

The present invention relates to methods and computer systems in the field of computerized relational database information retrieval.

BACKGROUND ART

Relational databases are organized into tables which consist of rows and columns of data. The rows are formally called tuples. A database will typically have many tables and each table will typically have multiple tuples and multiple columns. The tables are typically stored on random access storage devices (DASD) such as magnetic or optical disk drives. Data may be retrieved from this type of database by a variety of methods. For example, a computer program can extract information from the database without human intervention or a user can interact with a query system program which serves as a front-end to the database system. "Accessing a table" is used in the art to mean reading information from a table. Since the tables are normally stored on DASD, accessing a table requires transferring all or part of the table from DASD into the RAM of the computer system. When information is needed from a plurality of tables, the tables may be joined by the database software or firmware. Joins allow additional information to be obtained across tables in a meaningful way. A simple example would be that a table of employee information lists an employee's department number as '76', but the definition of department '76' requires reference to another table, the Department-table, which lists the full department title associated with each department number. In this second table the row for department '76' also contains a column with the department title "Information Systems Department." Thus, a user desiring to generate a report containing a list of all employees including their department titles may want to establish a join relationship between the department number column in the Employee-table and the department title column in the Department-table, so that the employee's department can be printed in the title form instead of the numerical form. Ways of specifying and performing joins are the subject of substantial effort. Database tables can be very large and processing tables can be expensive in terms of computer resources. Therefore, it is important that methods for joining tables be efficient.

The term cursor is used in the art for a mechanism for positioning a pointer to a tuple of a table. To 'open a cursor on a table' means position the cursor to the first row of the table that satisfies the selection criteria if any. At any point of time, there might be many cursors open on the same table, each may be positioned on a different (or the same) tuple.

The outer join operation is being introduced in major relational database systems, and is already proposed as part of the emerging SQL2 standard. (See ISO-ANSI Working Draft: Database Language SQL2 and SQL3; X3H2/90/398; ISO/IEC JTC1/SC21/WG3, 1990). However, there has not been a significant study of efficient execution methods for this kind of operation. In this specification, we describe a general method, and a more efficient method, called specialized method, which works for most of the common cases. One important property of these methods is that they allow several existing efficient join methods to be extended to support the outer join operation.

Conceptually, the SQL SELECT operation forms a cartesian product of the tables specified in the FROM clause and then selects the tuples that satisfy the predicates specified in the WHERE clause. As a result of this selection, some tuples of the input tables may not appear in the output; i.e., the operation loses some of the input tuples. A variant of the SQL SELECT operation, called outer join, has been defined, which does not lose any of the input tuples. (see 1. ISO-ANSI Working Draft: Database Language SQL2 and SQL3, supra; 2. C. Date, RELATIONAL DATABASE; SELECTED WRITINGS; Addison-Wesley Publishing Co. 1986). Several subcategories of the outer join operation have also been defined, called full outer join, left outer join, right outer join, and full natural outer join. Except for the full natural outer join, the rest are well defined only if two tables are specified in the FROM clause. The two tables are called left and right tables. If tuples of both tables (respectively, the left table or the right table) are preserved the operation is called full (respectively, left, right) outer join. Suppose we have two tables, $T_1(C_{11}, \ldots, C_{1n})$ and $T_2(C_{21}, \ldots, C_{2m})$. Full natural outer join is the counterpart of natural join, where the join predicate has the form $C_{11}=C_{21}=\ldots \Lambda C_{12}=C_{22}=\ldots \Lambda \ldots$. The columns $C_{1j}, C_{2j}, \ldots$ are called join columns. These columns appear in the output only in the form of $VALUE(C_{1h}, C_{2h}, \ldots)$, where the VALUE function returns the first non-NULL argument. The full natural outer join allows any number of tables as its operands.

In the following examples, we use a syntax close to the one proposed in ISO-ANSI Working Draft: Database Language SQL2 and SQL3 (supra):
FROM $T_1$ FULL JOIN $T_2$ ON <Predicate>

<Predicate> has the same format as the WHERE clause (a mixture of ANDs, ORs, and NOTs of conditional expressions, which include subquery predicates) of SQL statements. For a given outer join operation containing $T_1$ and $T_2$, there may be other predicates applied to $T_1$ and $T_2$ before the operation, and predicates applied to the result of the operation. Application of these predicates is done using the SQL SELECT operation, and is not part of the outer join operation as far as execution methods are concerned. In this specification, we explain methods which are specific to the outer join operation.

For example, suppose we have two tables, cs and ls (current sales and last year sales). Each of these tables have the following columns:

| | |
|---|---|
| pno | /*product number (unique key)*/ |
| ptype | /*product type */ |
| sales | /*amount of sales*/ |
| profit | /*amount of profit*/ |

We would like to formulate the following query (Query 1). Give all the current sales information, and last year sales information for products of the same type, if the current year sales are not profitable and the last year's sale amount is equal to or less than the current sale amount. Another way of saying the same query is as follows. Give all the current sales information and if they are not profitable then the last year sales information for products of the same type if their sale amount is equal to or less than the current sale amount. We refer to this example later in the description of the methods. For this reason, we chose to use the RIGHT outer join syntax.

Query 1:

```
SELECT *
    FROM ls RIGHT JOIN cs
        ON       ( ls.ptype = cs.ptype AND
                   ls.sales ≦ cs.sales AND
                   cs.profit ≦ 0
                 )
```

Note that all the tuples of cs table are preserved. One may wish to preserve all the tuples of ls table as well. For this, FULL outer join must be specified. In the above query, one or many of the predicates may be omitted to generate variations. All these variations have reasonable meanings. A variant of Query 1 is:

Query 2:

```
SELECT *
    FROM ls RIGHT JOIN cs
        ON       ( ls.pno = cs.pno    AND
                   ls.sales I≦ cs.sales AND
                   cs.profit ≦ 0
                 )
```

In this example a unique key column, pno, is used as a join column.

Predicate Forms

As mentioned before, the <Predicate> of the ON clause of the outer join has the same format as the WHERE clause (a mixture of ANDs, ORs, and NOTs of conditional expressions, which include subquery predicates) of SQL statements. Further, while our General Method handles the ON clause with this generality, our special methods can handle a set of special cases, but with more efficiency and simplicity. For example, if the ON clause is only an equality predicate, then our Special Method 1 is a much better choice. For this purpose, we define, without loss of generality, a form for the predicates in the ON clause. Next we identify a set of special cases, called predicate categories, based on this form. Later, we identify which of these categories can be handled more efficiently by our special methods.

Suppose we have two tables, $T_1$ ($C_{11}, \ldots, C_{1n}$) and $T_2$ ($C_{21}, \ldots, C_{2m}$). Let us assume, without loss of generality, that $T_1$ is the outer and $T_2$ is the inner of the join. Let us also assume that the ON clause has the following form.

$C_{11} \theta F_{11}(C_{21}, \ldots, C_{2m}, V_1, \ldots, V_h) \Omega$
$C_{11} \theta F_{11}(C_{21}, \ldots, C_{2m}, V_1, \ldots, V_h) \Omega \ldots$
$C_{1k} \theta F_{k1}(C_{21}, \ldots, C_{2m}, V_1, \ldots, V_h) \Omega$
$C_{1k} \theta F_{k2}(C_{21}, \ldots, C_{2m}, V_1, \ldots, V_h) \Omega$
$P_{12}(C_{11}, \ldots, C_{1n}, C_{21}, \ldots, C_{2m}, V_1, \ldots, V_h) \Omega$
$P_1(C_{11}, \ldots, C_{1m}, V_1, \ldots, V_h) \Omega$
$P_2(C_{21}, \ldots, C_{2m}, V_1, \ldots, V_h) \Omega$ Note that all these predicates are part of the outer join operation, and they are not the predicates that have to be applied before or after the outer join operation. Outer join predicates must be applied to a pair of tuples from the outer and the inner tables, even if the form of such predicates look like local predicates. Except for $P_2$, the rest are join or local predicates on $T_1$. $\theta$ may be =, >, ≧, <, ≦. The predicates involving $\theta$s are called special predicates. We will use these predicates in a special way in the methods. $\Omega$ may be the Boolean operator $\Lambda$ or v. Fs are scalar functions (more precisely, they must return at most a single value, as we will see below). The evaluation of these functions must not depend on the current cursor position of the outer table. For example, the scalar functions can be arbitrary expressions on the columns of inner tuples. The arguments $V_1, \ldots, V_h$ may be bindings passed to this outer join operation, which include, constants, host variables, and correlated column references. F functions may also involve subqueries. Again, evaluation of these subqueries must not depend on the current cursor position of the outer table. $V_1, \ldots, V_h$ may be the result of scalar subqueries. If a scalar subquery returns more than one value, then it is an error. If a scalar subquery returns no value then it is assumed that the subquery returns a NULL value. Later, we will discuss how we deal with these special cases. F function may be a subquery of the form: $C_{1k} \theta$ ALL (<subqueries>), where $\theta$ may be =, >, ≧, <, ≦. The above form of ALL subqueries can be converted such that the subquery returns at most one value, satisfying our constraint on the F functions. For example, if $\theta$ is >, then the subquery can return the maximum value only. If the subquery returns no value, then the predicate is TRUE.

$P_{12}$ can be any predicate involving columns of both tables. For example, $$(C_{15})_2 + C_{23} = 5$$

OR $$C_{11} + C_{21} \text{ IN (SELECT} \ldots \text{FROM} \ldots \text{WHERE} \ldots)$$

$P_1$ and $P_2$ are local predicates on $T_1$ and $T_2$. The predicate on profit in Query 1 and 2 is an example of a $P_2$ predicate. The rest are a set of join or local predicates on $T_1$. We define different categories of predicates:

Category 1: Conjuncts of special equality predicates:
all $\Omega$s are $\Lambda$s, $\theta$s are equalities, and we allow $P_{12}$ to exist if the following two conditions hold. First, $C_{11}, \ldots, C_{1k}$ form a unique key of $T_1$ table. Second, none of the above columns have associated with them only an $F_{ij}$ which is a universal quantifier subquery (ALL subquery). Note that in this case, the special equality predicates on the columns not part of the unique key are also considered to be part of $P_{12}$. Example Query 2 falls into this category since pno is a unique key of the outer relation. Also, Query 1 falls into this category if we eliminate the predicate ls·sales≦cs·sales. This is the most common form of outer join predicates, and our methods are tuned for this case. Note that we allow multiple special equality predicates for a given column.

Category 2: A predicate is not in category 1 and contains conjuncts of special equality or inequality predicates:
all $\Omega$s are $\Lambda$s, each $\theta$ is one of =, >, ≧, <, ≦, and $P_{12}$ does not exist. Example Query 1 falls into this category.

Category 3: None of the above.
This category is handled by the general method described below, and will not be discussed further.

First for background information we will discuss a simple method, called the general method, that handles all the categories. Throughout this discussion we assume the joins are done pair-wise. The sequential general method is as follows. Assume $LOCP_1$ and $LOCP_2$ are non-outer-join local predicates on $T_1$ and $T_2$ respectively. The inputs to the outer join operation are $T_1$ and $T_2$ after application of the local predicates. Here we assume the query spec is: apply $LOCP_1$ predicate on table $T_1$ and apply $LOCP_2$ predicate on table $T_2$ then do the outer join of the results using the predicate OUTJP. For the natural full outer join, we may have more than two tables.

As used in the following descriptions a TID is a tuple identifier. Typically, it consists of two parts: a page ID concatenated to a slot number (an index into an array). By accessing the particular slot in the array at the bottom of the particular page, the pointer to the actual location of the tuple on the page can be obtained. A TID-list is a list of TIDs obtained by accessing an index. The index entries are of the form <key value, TID>.

When we say that results of an operation are output, this simply means that the results are either displayed to a user or stored in some form of memory in the computer (RAM, DASD, TAPE, etc.) for subsequent use.

General Sequential Method

Execute the query;
Output its results (may be piped to the next stage);
During this execution, form one list (TIDS_list) with distinct TID
   or eliminate duplicates later;
For each preserved table,
  {Sort the list and eliminate duplicates (if TIDs are not distinct);
  Scan the associated original table (e.g., $T_1$);
    {For each tuple
      {if its TID is in TID_list and $LOCP_1$ is true
        {output the tuple
          with NULL values for the columns of the other table;
        }
      }
    }
  }
}

Note that the second part of the method does the preservation. This part is very similar to a merge join of the table and the sorted TID list. This method can be further optimized if we scan a table during the first phase. Suppose $T_1$ is scanned in the first phase. In the TID list of $T_1$, we remember all the TIDs that satisfy predicate $LOCP_1$, and we mark the ones that are part of the output (i.e., satisfied the JOINP join predicate). During the second phase, we just need to scan this list, get the TIDs that are not marked, and preserve their associated tuples.

As mentioned before, the advantage of this method is that it handles all categories of predicates explained above. However this method has several disadvantages:

1. One major disadvantage is the overhead of reaccessing the input tables in the second part of the method. Note that this requires the input table to be stored. Therefore, we cannot pipeline the input tables. Pipelining is much more efficient in many cases.

2. Output does not preserve ordering. Suppose the tables $T_1$ and $T_2$ were outer joined, and a merge join was done in the first step of the general method. Therefore, the order of $T_1$ is preserved at the output. However, the second step of the method adds more tuples to the output. As a result, we lose this ordering.

Our specialized method described below does not have these disadvantages, handles most of the cases, and is a more efficient method than the general method. The left outer join can be handled easily by an extension to a class of existing join methods such as nested loop, merge scan, hash join, hybrid join, etc. All these methods scan the outer table (at some stage) once and find the matching inner tuples. At a given scan position, if no tuple of the inner table matches the outer tuple, the outer tuple is output with NULL values for the inner columns. Handling of the full outer join, which requires preserving the inner tuples also, is more involved. In the full outer join, preservation of the outer tuples can be done in the same way as the left outer join. The preservation of the inner tuples requires more work. The same is true for the right outer join. Note that although semantically we can convert the right outer join to the left outer join, we may not want to do this because it might be more expensive. Even a left outer join query may have to be executed as a right outer join for cost reduction. An example of the case that right outer join is preferable is when the table that has to be preserved has a good access path, and the other table is large and does not have a good access path, therefore, we want to scan it only once. If this table is the inner, then for each tuple of the outer we have to scan it, resulting in very poor performance.

As mentioned before, the full outer join is a combination of the left and the right outer joins. We have shown a simple and efficient way to preserve the tuples of the outer table of an outer join operation. The rest of this specification describes methods for preservation of the tuples of the inner table.

In published Japanese patent application titled "OUTER JOINING OPERATION SYSTEM OF RELATIONAL DATA BASE", JP 59-125461, an improvement of a basic method for outer join is described. The basic method will perform full outer join in 4 stages: 1. inner join in a temporary table; 2. left outer join in a temporary table; 3. right outer join in a temporary table; 4. retrieve from the temporary table. The described improvement will eliminate the use of the temporary table. The present invention is completely different from this as will be seen below.

C. Date (RELATIONAL DATABASE; SELECTED WRITINGS, supra), A. Pirotte (A Formal Definition of the Relational Model, ACM SIGMOD Record, 13(1), 1982) and the ISO-ANSI draft (ISO-ANSI Working Draft: Database Language SQL2 and SQL3, supra) define the syntax and semantics for outer join. A. Rosenthal and D. Reiner (Extending the Algebraic Framework of Query Processing to Handle Outerjoins, Proc. 10th International Conference on Very Large Data Bases, Singapore, August 1984) address the execution problem for outer join. Their paper covers the case where the left table needs to be preserved, which is the same as the simple extension explained earlier. However, the paper neither allows the preserved table to be the inner, nor provides a method for full outer join, which are features of the present invention. The paper mentions that these cases require extra processing with no further detail. In this application, we have provided methods to handle all these cases. Further, we have described two specialized methods, which can be used as an extension to a class of known efficient join methods (e.g., nested loop, merge join, hybrid join, and hash join) with minimal extra processing.

No reports of a method for parallel execution of outer join have been found in the literature.

DISCLOSURE OF INVENTION

The method determines a plurality of responsibility regions in the inner table using a specified set of columns such that every tuple in the inner table belongs to one and only one responsibility region. When the tuples of the outer table are processed in sequence each responsibility region is processed only once during the sequence. The processing of each responsibility region involves outputting all tuples of the inner table which are in the defined responsibility region. Since the responsibility regions are defined so that each tuple in the inner table belongs to one and only one responsibility region the processing of the responsibility regions guarantees that each tuple in the inner table will be preserved only once. A method for performing an outer join is described using responsibility regions which are functions of the current and the next cursor positions in $T_1$ (the outer table) which is sorted on the columns being joined or accessed via an index on the join column. The method works without sorting $T_2$ (the inner table) and, thereby, achieves a significant efficiency advantage. The values for the columns being joined for each tuple are referred to as a set of column values. Each tuple in $T_1$ is processed and each unique set of column values is assigned a responsibility region in $T_2$. The processing of each tuple in $T_1$ then includes the preservation in the join output of all tuples in $T_2$ which are in its responsibility region. In the preferred embodiment the initialization step of the process preserves in the join output all of the tuples in $T_2$ which have column set values less than the lowest column set value in $T_1$, i.e., the first tuple in $T_1$. In other embodiments the region defined for the first tuple in $T_1$ could include the region covered by the initialization. The responsibility region for tuples in $T_1$, other than the last tuple, is defined as those tuples which have column set values less than the column set value for the next tuple in $T_1$ and greater than or equal to the column set value for the current tuple. The last tuple in $T_1$ must preserve all of the tuples in $T_2$ which have not already been preserved in $T_2$, i.e., all tuples greater than or equal to the column set value found in the last tuple. If $T_1$ has duplicate values for the column set value, then only the last tuple of the duplicates has a non-NULL responsibility region, i.e., only the last one preserves the associated $T_2$ tuples. The rest of the duplicated tuples have NULL responsibility regions, and do not preserve any $T_2$ tuples. For these regions, only a regular join is performed. This prevents multiple preservations of the $T_2$ tuples. Access of $T_2$ is based on the predicate which defines the responsibility region; therefore the inner table does not need to be sorted. Using this method each tuple in $T_2$ appears in join output.

Ways of extending the method for parallel execution of the outer join methods are described to assign partitions of the tables to tasks and eliminate possible duplicates. Extension of the method to subqueries is also described.

The foregoing and other objects, features and advantages of the invention will be apparent from the following more particular description of (a) preferred embodiment(s) of the invention, as illustrated in the accompanying drawing(s).

BRIEF DESCRIPTION OF DRAWINGS

FIG. 3 illustrates a practical example of the use of the method.

FIG. 10 is a process flow diagram illustrating the operations preferred in carrying out an alternative ARJOIN Specialized Method 1 embodiment of the present invention as described in Table 5.

BEST MODE FOR CARRYING OUT THE INVENTION

Figure 1:
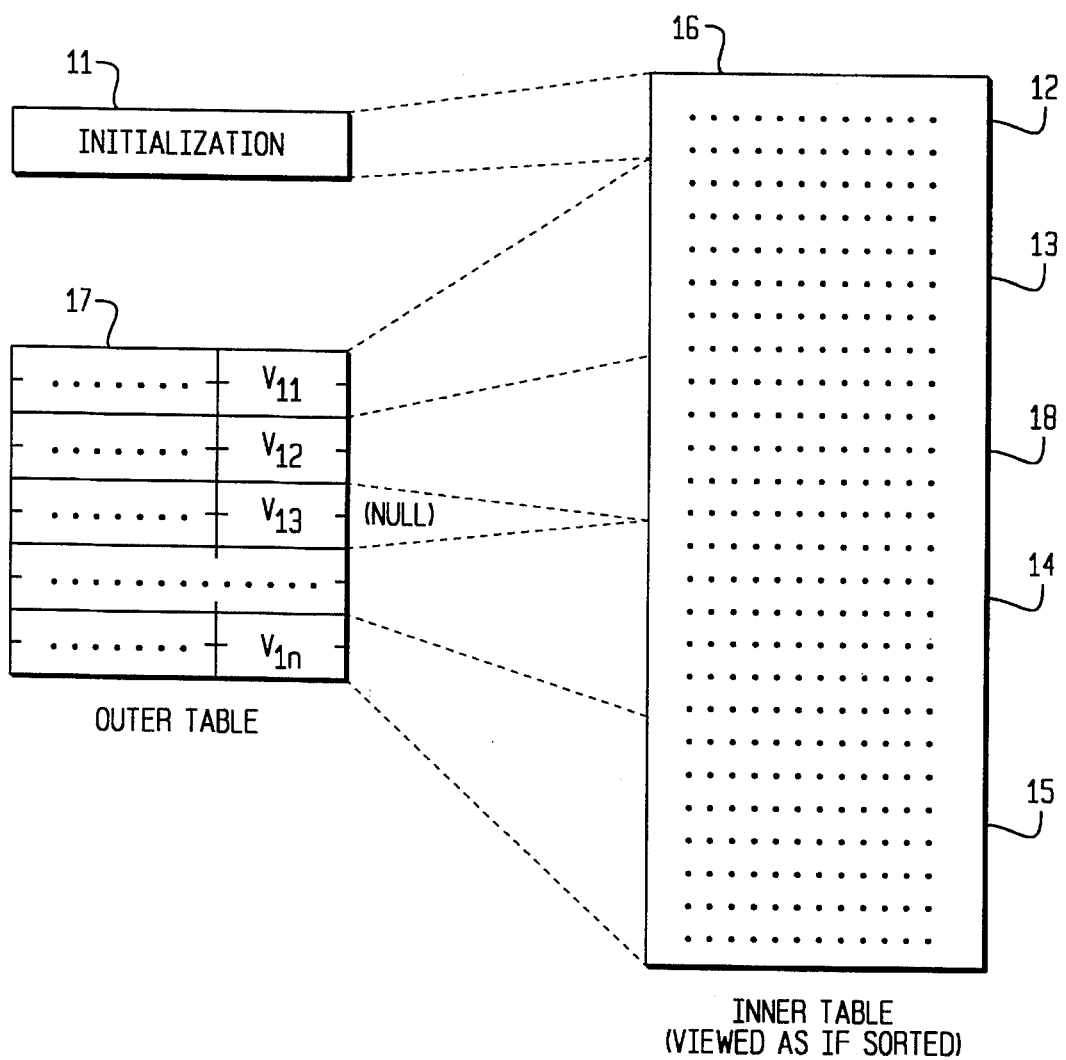
FIG. 1 is a conceptual representation of the mapping of responsibility regions from the outer table to the inner table with the inner table being viewed as if sorted.

FIG. 1 illustrates the concept of mapping tuples in the outer table 17 to sets of tuples in the inner table 16. For purposes of illustration the inner table is shown as if it were sorted even though in actual applications the inner table is not sorted as will be seen. The outer table need not actually be sorted, since all that is required is that the outer table be accessed in the appropriate sort order. Use of an index which allows the outer table to be accessed in the correct order obviates the need to actually sort the outer table. The mapped sets of tuples in the inner table are said to be in the responsibility region for the corresponding tuple in the outer table. FIG. 1 shows the most simple case where a single column value in the outer table is being used, but multiple column values work in the same way. The tuple in the outer table with column value $V_{11}$ maps to the responsibility region 13 in the inner table. A responsibility region may contain no tuples or a large number. When column values in the outer table are duplicated as is illustrated by $V_{13}$ the responsibility region for all but the last duplicate are null. The initialization step of the method 11 is assigned the responsibility region 12 for all records in the inner table which have values less than the lowest applicable column values in the outer table, i.e., $V_{11}$ in FIG. 1. The last tuple in the outer table, shown as having value $V_{1n}$ is assigned the responsibility region 15 which contains all tuples of the inner table which have values greater than or equal to its applicable column value, i.e., $V_{1n}$. Each responsibility region starts where the previous region ends and extends to where the next one begins, thereby covering all of the inner table and guaranteeing that all tuples of the inner table belong to one and only one responsibility region.

Figure 2:
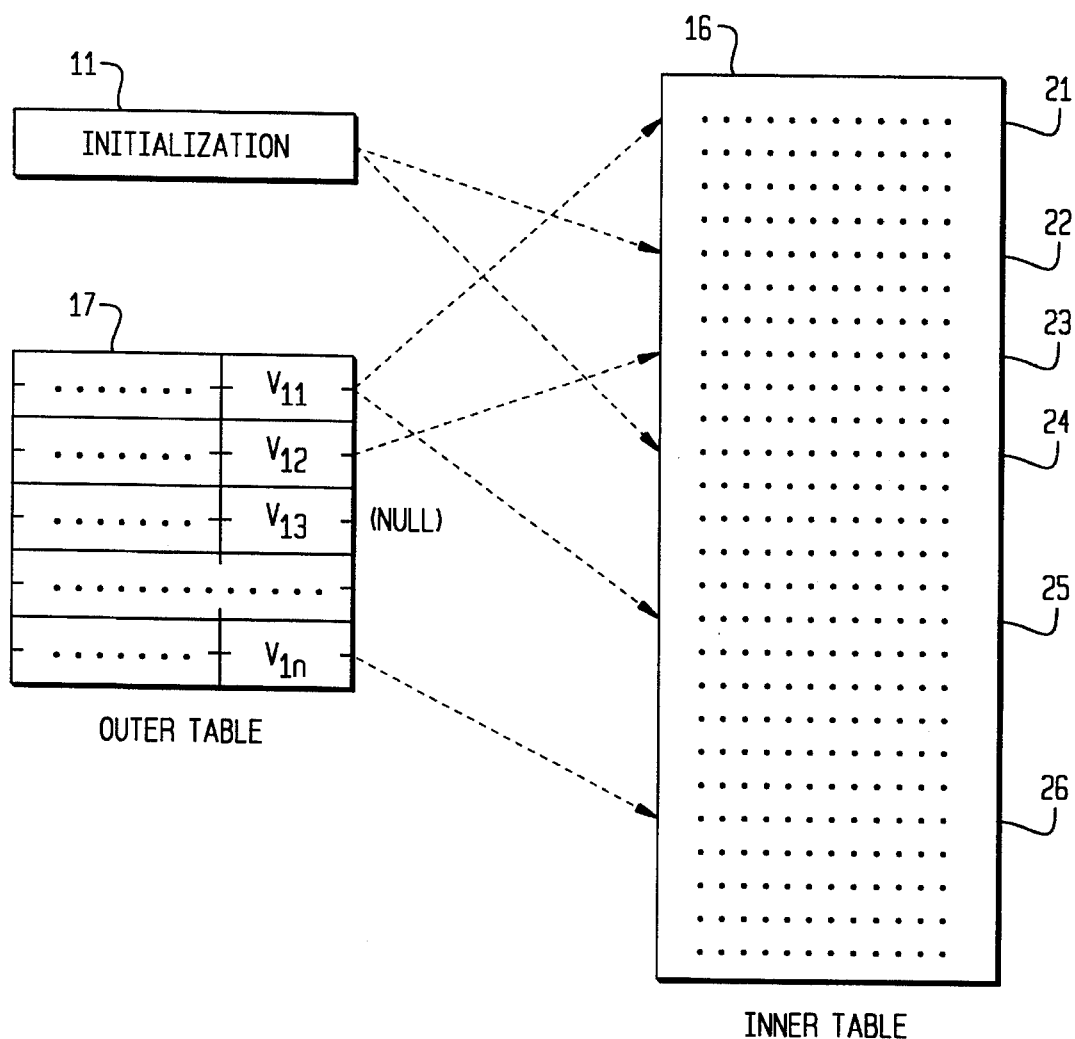
FIG. 2 is a representation of the mapping of responsibility regions from the outer table to the inner table showing that the tuples in the inner table for a responsibility region are not contiguous because the inner table is not sorted in practice.

FIG. 2 illustrates that the tuples which comprise the responsibility regions are not contiguously located in practice. Thus, the initialization responsibility region comprises tuples 22 and 24. The tuple with value $V_{11}$ maps to tuples 21 and 25, $V_{12}$ maps to 23, and $V_{1n}$ maps to 26. Every tuple in the inner table must be mapped to a tuple in the outer table, but for simplicity of presentation in FIG. 2 the other mappings are omitted. The mapping into the inner table is by the content of the appropriate columns of the tuples and the actual location in the inner table is unimportant.

Methods for Category 1

Assume $T_1$ is ordered on $C_{11}, \ldots, C_{1k}$ (from most significant to least significant ordering). We assume that the ordering is the ascending order. If the order is descending for any of the columns then one can take the complement of the values of those columns (e.g., 01 becomes 10), hence viewing them in ascending order. The inner table can be accessed in any order; this can be decided by the optimizer. Therefore, this method can be used as an extension to join methods such as, nested loop, merge scan, hybrid join, and hash join (as we will explain later). This method handles example Query 2 because the join column pno is a unique key of the outer table, hence $P_{12}$ is allowed. The inequality join predicate is considered to be part of $P_{12}$. Suppose $s_1$ is the name of the scan on the outer table ($T_1$), and $s_{1j}$ is the scan position on tuple j of the outer table.

To explain the method, let's define a variable x. This variable may have one value for each tuple of $T_1$. This value is computed using the function X, which concatenates the values of $C_{11}, \ldots, C_{1k}$. Also, this variable has one value for each tuple of $T_2$, which is computed by first mapping the columns of the tuple of $T_2$ to $C_{11}, \ldots, C_{1k}$ using the $F_{1j}(\ldots)$ functions, and then concatenating them. If there are multiple $F_{1j}(\ldots)$ functions for a given column of $T_1$ (i.e., there are multiple equality predicates for a given column of The method requires the following conditions to hold. (1) There is exactly one responsibility region for each inner table tuple. (2) If a tuple of the inner table does not match the outer tuple associated with its responsibility region, then it does not match any tuple of the outer table. This allows us to decide whether to preserve an inner tuple or not given the outer tuple of its responsibility region. There is no need to remember if an inner tuple has a match (hence must not be preserved), does not have a match at all, or has been preserved. This leads to a much simpler and a more efficient method. NULL values may be returned by any of the $F_{ij}$ functions. No special treatment of NULL values is required since they are treated like any other value. If an $F_{ij}$ function is a universal subquery (ALL case), then it is possible that it returns no value. For assignment of a responsibility region, we convert no-value to NULL (obviously, we still do evaluation of the predicate as usual, i.e., an empty universal subquery predicate returns TRUE).

TABLE 1

| Specialized Method 1 - Sequential Version | FIG. 4 Reference Numerals |
| --- | --- |
|  | 400 |
| /*In the following, s is a cursor on $T_1$ */ |  |
| open s on $T_1$; | 405 |
| j= 0; | 410 |
| $s_j$= no tuple; | 415 |
| while ( not eof ($s_j$) ) | 420 |
| { |  |
|    $s_{j1}$ = fetch_next;  /* = eof if at end of file */ | 435 |
|    /*assume $X(s_0) = -\infty$ and $X(S_{eof}) = \infty$ */ | 435 |
|    if $(X(s_j) = X(S_{j+1}))$ | 440 |
|      { Region = ' = X ($s_j$ ) '; /*NULL Region */ } | 445 |
|    else | 440 |
|      { Region = ' $\geq$ X ($s_j$ ) $\Lambda < X(s_{j+1})$ '; } | 470 |
|    ACCESS $T_2$ where x of tuple of $T_2$ is in Region; | 450 |
|    for each tuple returned | 455 |
|    { |  |
|      if (NULL Region) { do the same as regular join; } | 455, 460 |
|      else | 455 |
|         { apply the join predicate; | 475 |
|           if (matched) { output the result;} | 480, 485 |
|           else /*preserve tuples*/ | 480 |
|             { output the $T_2$ tuple with NULL values for $T_1$;} | 490 |
|         } |  |
|    } | 465 |
|    j = j+1; | 430 |
| } | 425 |

$T_1$), we choose one of them as part of the special predicates. (In the parallel version of the methods, we would like to choose the equality predicate where its $F_{1j}$ returns a value which is more likely to be different for different tuples of $T_2$. This gives us a better distribution of the number of tuples assigned to different responsibility regions, defined below). In the parallel case, each responsibility region is handled by one task. Hence, we get a better balancing of the load associated with preservation among tasks. Since $T_1$ is ordered on $C_{11}, \ldots, C_{1k}$, then we have all of the x values of $T_1$ tuples ordered in a one dimensional space. We divide this one dimensional space into regions, called responsibility regions. Responsibility region j contains all the values $\geq$ the value of x corresponding to cursor position $s_j$ and < the value of x corresponding to cursor position $s_{j+1}$. If the x value is the same for these two cursor positions, then the responsibility region is NULL, and it does not preserve any tuple. Basically, in this method, cursor position $s_j$ is responsible for preserving all the tuples of $T_2$ that map to its responsibility region.

Figure 4:
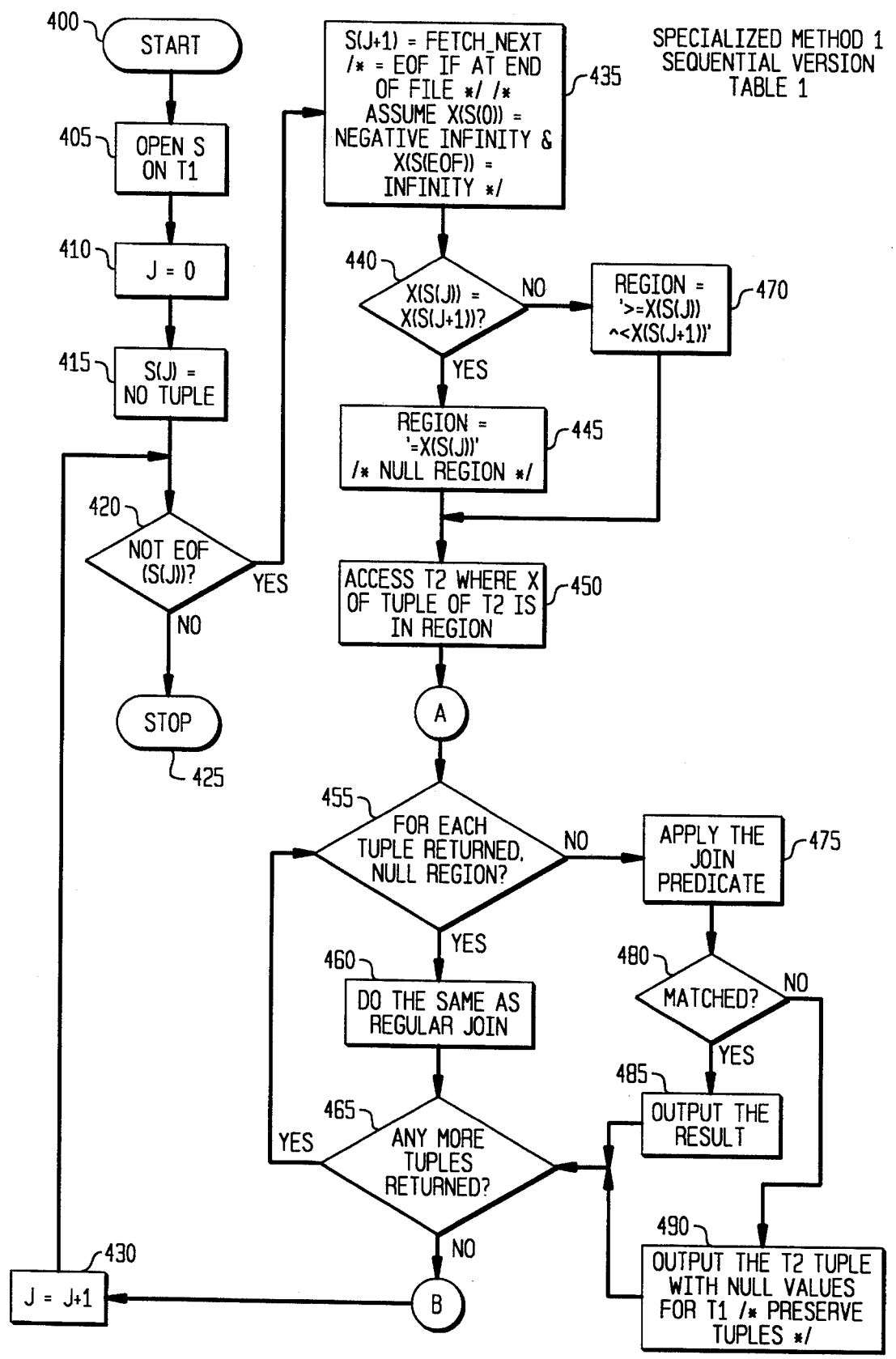
FIG. 4 is a process flow diagram illustrating the operations preferred in carrying out a Specialized Method 1 embodiment of the present invention as described in Table 1.

Referring now to FIG. 4, FIG. 4 is a process flow diagram illustrating the operations preferred in carrying out a Specialized Method 1 embodiment of the present invention as described in the above Table 1. The rightmost column of Table 1 entitled "FIG. 4 Reference Numerals" indicates the reference numbers of those process blocks of FIG. 4 corresponding to the pseudocode statements of Table 1.

Observe that each responsibility Region is a function of the current and the next cursor positions. If the outer table has duplicate values for columns $C_{11}, \ldots, C_{1k}$ then only the last tuple of the duplicates has a non-NULL responsibility region, i.e., only the last one preserves the associated inner tuples. The rest of the tuples form NULL responsibility regions, and do not preserve any inner tuples, i.e., for these regions, only a regular join is performed. This prevents multiple preservations of the inner tuples. Access of the inner is based on the predicate which defines the responsibility region. Note that this is a weaker predicate than the one specified in the ON clause.

FIG. 3 illustrates a simple application of the method. Table 1 is the outer table which is sorted on the column Prod# and Table 2 is the inner table which is not sorted. Because there are five tuples in the outer table j will go from 0 to 5. Each table has the column Prod#. At j=0 the initial responsibility region is set to "$\geq -\infty$ and <10". The minus infinity term is used to mean a number which is less than the smallest number which can appear in the database. Thus, the equivalent expression is all values less than 10. The value 10 is found by looking ahead to j=1 which is the outer table tuple for Wire which has a Prod# of 10. In the preservation step tuple 6 of the inner table is preserved by this initial responsibility region, since it has a Prod# number value of 2 which is less than 10. The next pass through the loop is for j=1. The method determines that the outer tuples at j=1 and j=2 have the same Prod# column values, i.e. 10, and, therefore, a null responsibility region is defined which results in outputting the join of the Wire tuple with tuple 2 of the inner table which is the Relay tuple, since the Relay tuple has Prod# equal to 10. For j=2 the Magnets tuple is assigned the responsibility region "$\geq 10$ and <30" and, therefore, preserves tuple 2 of the inner table since it has a Prod# of 10. Handling of j=3 and 4 are similar. For j=5 the look ahead reveals that the end of the table has been found and that the Blades tuple must, therefore, preserve all of the tuples which have not been previously preserved. Thus, the final responsibility region is set to "$\geq 205$ and <$\infty$" which preserves tuples 1, 5, and 7 which have Prod#'s of 505, 205, and 900. Each tuple of the inner table has been assigned one and only responsibility region.

A sketch of correctness proof of the method is as follows. We have to show that (1) a tuple of the inner has only one responsibility region, and (2) if it does not match the outer tuple in that region then it does not match any outer tuple. The first condition holds because the X function maps a tuple of $T_2$ to exactly one point in the one dimensional space, and the responsibility regions do not overlap in this space, and they cover the whole space. As mentioned earlier, in the case that we have multiple special equality predicates on a column, hence multiple $F_{ij}(\ldots)$ functions, we choose only one of these functions to determine the responsibility regions. The reason for this is to map a given tuple of $T_2$ to exactly one responsibility region. To show that the latter condition holds, let's assume $C_{11}, \ldots, C_{1k}$ form a unique key of table $T_1$. Therefore, all x values of tuples of the outer table are unique. Then there are no NULL responsibility regions (there are no duplicates in the outer table). For a tuple of $T_2$ to match, its x value must match the x value of a tuple of the outer table. However, all x values in other responsibility regions have a value less than or greater than the x value of this responsibility region. Therefore, a tuple of $T_2$ cannot match any tuples of other responsibility regions, thus satisfying the above condition. Note that this is true even if the tuple matches in its responsibility region. Now suppose $C_{11}, \ldots, C_{1k}$ does not form a unique key. If a tuple of $T_2$ does not match in its responsibility region, then it means that its x value is not equal to the x value of the outer tuple of this responsibility region or $P_2$ was false. Note that in this case we do not allow predicates of type $P_{12}$. If the x value does not match then it does not match in any other region because they have an x value less than or greater than this responsibility region. If x matches but $P_2$ is false, then again the predicate does not match because $P_2$ will be false in all regions because it is not a function of columns of $T_1$. Therefore, the second condition holds. If $T_1$ is empty, then all the tuples of $T_2$ must be preserved. In the above method, if $T_1$ is empty, Region='<$\infty$'. Therefore, ACCESS retrieves all the tuples of $T_2$, and since none of the tuples will match, all of them are preserved.

Outer join can also be used in conjunction with hash join in this case. One can use the proposed outer join method within a hash bucket, i.e., after forming the hash bucket of the outer table, sort the tuples on the join column, then follow the above method to do the bucket join. First observe that there is only one responsibility region for a given inner tuple. This is because the inner tuple is only part of one bucket, hence participates only in one bucket join. And within a bucket, the above method guarantees one responsibility region for each inner tuple. Also, if an inner tuple does not match the outer tuple of its responsibility region, it does not match anywhere. This is guaranteed within a hash bucket by the above method. And the inner tuple does not match any other hash bucket. Hence it does not match any other tuple.

It is possible that ACCESS applies only part of the ACCESS predicates. In the regular join the rest of the predicates must be applied as residuals. In the part of the method that deals with preserving the inner tuples, we need to apply the residual predicates to find the matched tuples. ACCESS applies only part of the ACCESS predicates, hence returning tuples that may not be part of this responsibility region. Therefore, we must also apply the residual responsibility region predicates to identify the ones that need to be preserved. The part of the method that does the matching and preservation must be changed as follows:

TABLE 2

Figure 5:
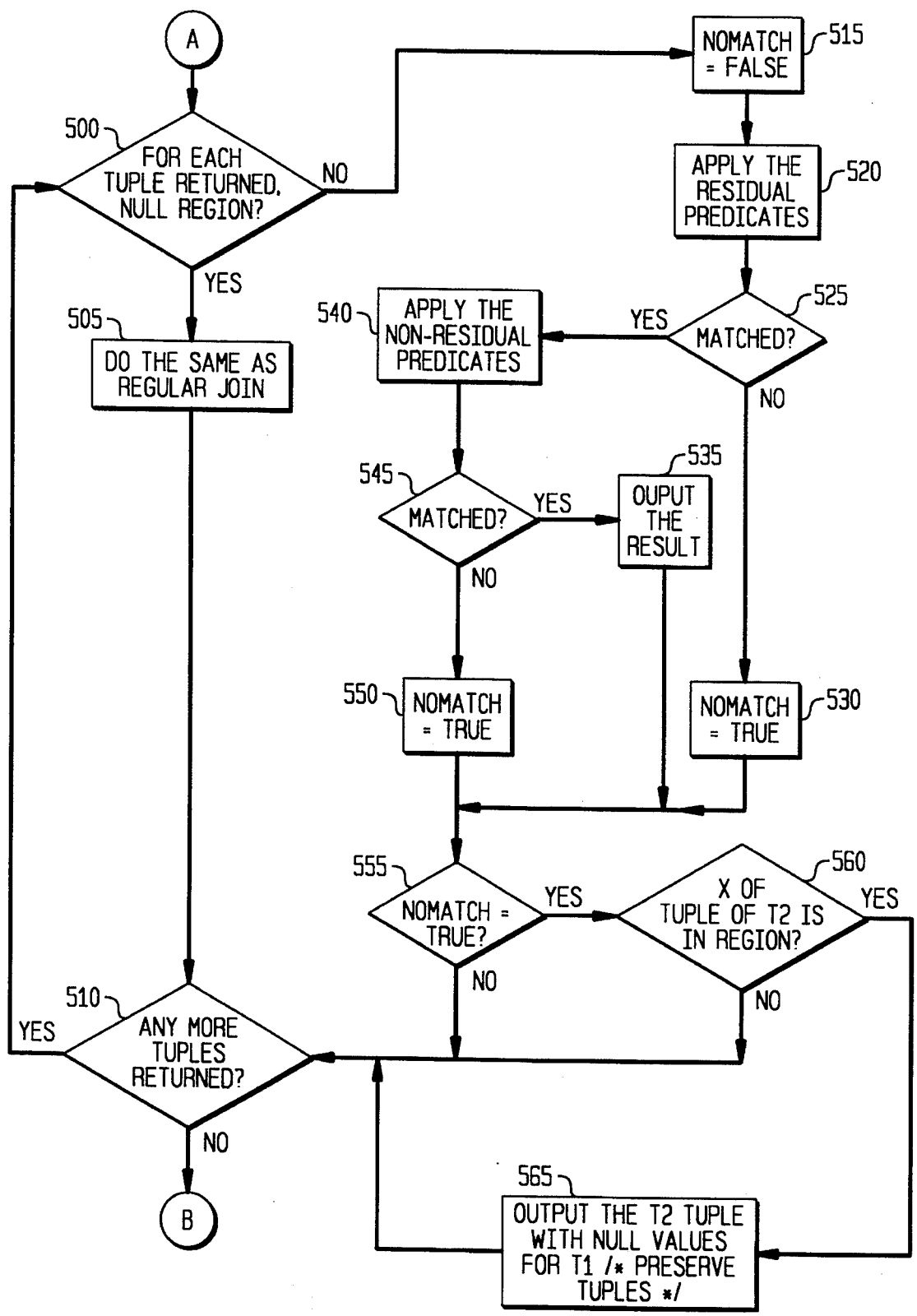
FIG. 5 is a process flow diagram illustrating the operations preferred in carrying out a Caching Technique portion of an alternative Specialized Method 1 embodiment of the present invention as described in Table 2.

|  | FIG. 5 Reference Numerals |
|---|---|
| { | |
| if (NULL Region) { do the same as regular join; } | 500, 505 |
| else | 500 |
| { | |
|   nomatch = FALSE; | 515 |
|   apply the residual predicates; | 520 |
|   if (matched) | 525 |
|   { | |
|     apply the non-residual predicates | 540 |
|     if (matched) { output the result;} | 545, 535 |
|     else { nomatch = TRUE;} | 550 |
|   } | |
|   else { nomatch = TRUE;} | 530 |
|   if (nomatch= TRUE) | 555 |
|   { | |
|     if (x of tuple of $T_2$ is in Region) | 560 |
|     { /*preserve tuples*/ | 565 |
|       output the $T_2$ tuple with NULL values for $T_1$; | 565 |

TABLE 2-continued

| | FIG. 5 Reference Numerals |
|---|---|
| `}`<br>`}`<br>`}`<br>`}` | |
| | 510 |

Referring now to FIG. 5, FIG. 5 is a process flow diagram illustrating the operations preferred in carrying out a Caching Technique portion of an alternative Specialized Method 1 embodiment of the present invention as described in the above Table 2. The rightmost column of Table 2 entitled "FIG. 5 Reference Numerals" indicates the reference numerals of those process blocks of FIG. 5 corresponding to the pseudocode statements of Table 2. This alternative embodiment of FIG. 5 results from replacing those process steps between flowchart connectors A and B of FIG. 4 (process steps 455, 460, 465, 475, 480, 485, and 490) with the process steps between flowchart connectors A and B of FIG. 5 (process steps 500, 505, 510, 515, 520, 525, 530, 535, 540, 545, 550, 555, 560, and 565).

In this method, if there are tuples with duplicate values for $C_{11}, \ldots, C_{1k}$ then the result of previous ACCESS of $T_2$ can be cached and used again during processing of the next duplicate tuple of $T_1$, except the last one. The last one must access both the matching and the preserved tuples. The caching technique is also applicable to regular merge join, or even nested loop if the outer table is sorted.

As mentioned before, in this category if $C_{11}, \ldots, C_{1k}$ do not form a unique key, we do not allow predicates of type $P_{12}$. Here is an example that explains the reason for this. Suppose we have the following variation of Query 1.

```
Query 3:
SELECT *
    FROM ls RIGHT JOIN cs
        ON        ( ls.ptype = cs.ptype AND
                    ls.profit/ls.sales < cs.profit/cs.sales
                  )
```

The first predicate is not on a key column and the second predicate is of type $P_{12}$. Now consider the following data. The ls table must be ordered on the ptype column, as required by the method. The cs table does not need to have any order, however for ease of reading it has the same order as that of the ls table.

| last year sales (ls table) | | | | | current year sales (cs table) | | | |
|---|---|---|---|---|---|---|---|---|
| tuple profit no | pno | ptype | sales | profit | tuple no | pno | ptype | sales |
| 1 $10 | 1 | 1 | $100 | $10 | 1 | 1 | 1 | $100 |
| 2 | 7 | 2 | $50 | $7 | 2 | 11 | 2 | $50 $7 |
| 3 $20 | 8 | 2 | $150 | $40 | 3 | 9 | 2 | $150 |
| 4 $30 | 3 | 2 | $200 | $60 | 4 | 3 | 2 | $200 |
| 5 $25 | 2 | 2 | $300 | $25 | 5 | 2 | 2 | $200 |
| 6 $60 | 10 | 2 | $400 | $70 | 6 | 10 | 2 | $400 |
| 7 $100 | 15 | 3 | $250 | $75 | 7 | 15 | 3 | $400 |

Tuple 5 of cs matches tuple 4 in ls, and it does not match tuple 6 in ls. Tuple 6 of ls forms the responsibility region that tuple 5 of cs belongs to. As a result, since tuple 5 of cs does not match in its responsibility region it is preserved, which is wrong because it had a match. In other words, this tuple does not match the outer tuple in its responsibility region but it has a match somewhere else. As a result, the second condition of the specialized method does not hold.

In the specialized method 1, after ACCESS, we apply the ON clause predicate. As a result, the part of the ON clause that is applied by ACCESS is applied twice. The reason for this is that ACCESS accesses both matching tuples and the tuples that must be preserved, and they must be separated out later. This clearly can be avoided for NULL responsibility regions. To handle this refinement, we describe specialized method 2, which separates the access of the matching tuples and the preserved tuples. We use two different accesses for the inner table. One to access the matching tuples, and one to access the preserved tuples. The specialized method 2 does not apply to methods such as merge join, which require one scan of the inner table (hence one ACCESS).

TABLE 3

| Specialized Method 2 - Sequential Version | FIG. 6 Reference Numerals |
|---|---|
|  | 600 |
| j=.0; | 605 |
| /*In the following, s is a cursor on $T_1$ */ |  |
| open s on $T_1$; | 610 |
| $S_0$= no tuple; | 615 |
| while ( not eof ($s_j$) ) | 620 |
| { |  |
|    $s_{j+1}$ = fetch_next; /* = eof if at end of file*/ | 635 |
|    /*assume $X(s_0) = -\infty$ and $X(s_{eof}) = \infty$ */ | 635 |
|    if ($X(s_j) = X(S_{j+1})$) | 640 |
|      { Region = NULL; /*NULL Region */ }. | 645 |
|    else | 640 |
|      { Region = ' $\geq$ X ($s_j$ ) $\wedge$ < $X(s_{j+1})$;} | 665 |
|    /*get the matching tuples*/ | 650 |
|    ACCESS $T_2$. where < ON clause>; | 650 |
|    for each tuple returned { output the result;} | 655 |
|    if (Region NULL) | 660 |
|    { |  |
|      /*get the tuples that need to be preserved*/ | 670 |
|      ACCESS $T_2$ | 670 |
|        where x of tuple of $T_2$ is in Region $\wedge$ NOT <ON clause> | 670 |
|        for each tuple returned | 675 |
|          {output the $T_2$ tuple with NULL values for $T_1$;) | 675 |
|    } |  |
|    j = j+1; | 630 |
| } | 625 |

Figure 6:
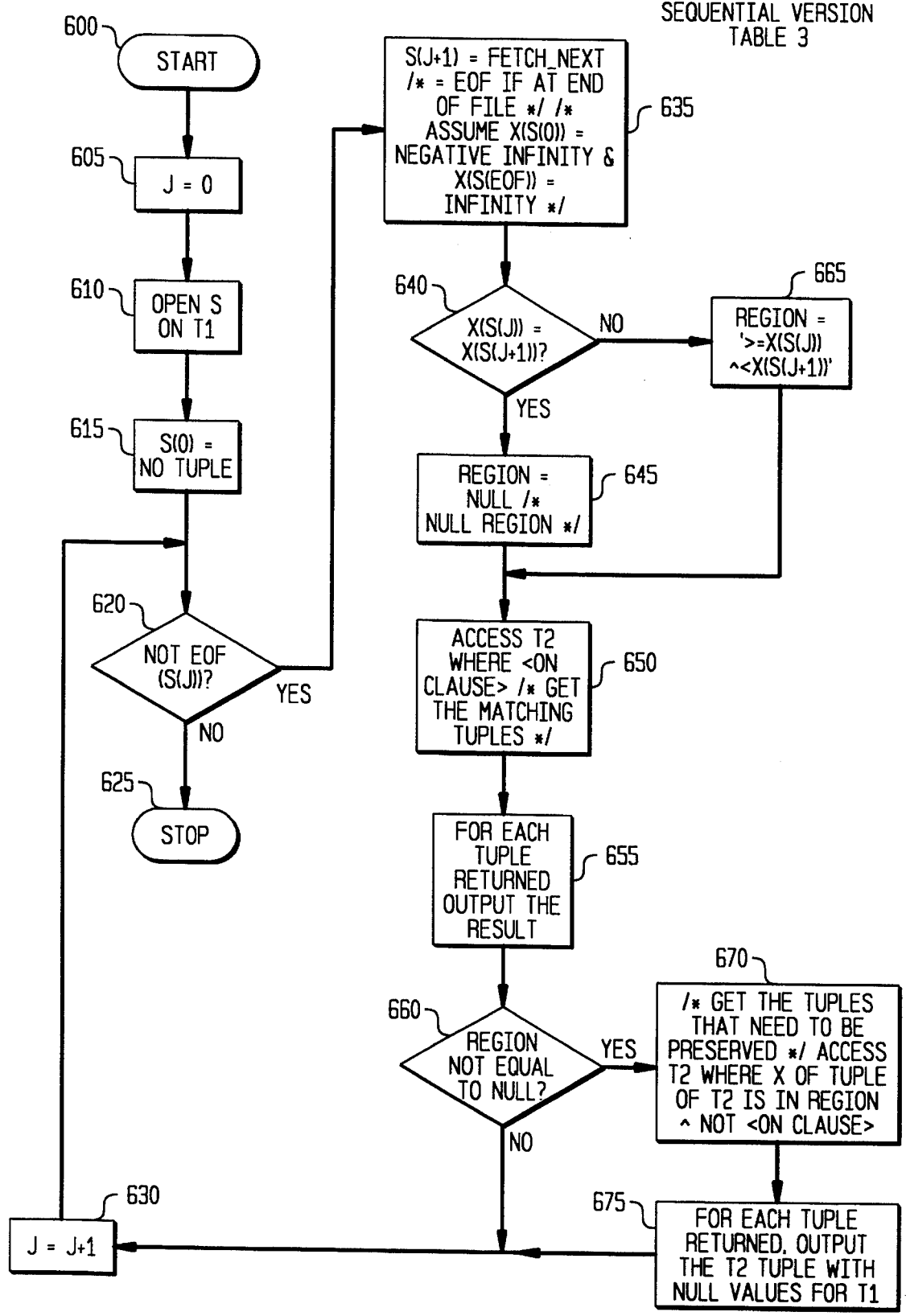
FIG. 6 is a process flow diagram illustrating the operations preferred in carrying out a Specialized Method 2 embodiment of the present invention as described in Table 3.

Referring now to FIG. 6, FIG. 6 is a process flow diagram illustrating the operations preferred in carrying out a Specialized Method 2 embodiment of the present invention as described in the above Table 3. The rightmost column of Table 3 entitled "FIG. 6 Reference Numerals" indicates the reference numerals of those process blocks of FIG. 6 corresponding to the pseudocode statements of Table 3.

Similar to the specialized method 1, if there are tuples with duplicate values for $C_{11}, \ldots, C_{1k}$ then the matched tuples can be cached and used again during processing of the next duplicate tuple of $T_1$. Obviously, when the cursor is on the last one of these duplicates, we have to access the inner table for the tuples that need to be preserved.

Methods for Category 2

We consider several cases:

1. All inequalities are associated with the column of $T_1$ which is the least significant one in the $T_1$ ordering, i.e., $C_{1k}$. Note that many inequalities may be specified for this column. For example:

$$C_{1k} > F_{k1} (\ldots) \wedge C_{1k} \leq F_{k2} (\ldots).$$

Query 1 described earlier falls into this category.

The responsibility region assignment is slightly different than the equality case. A tuple of $T_2$ maps to a (possibly empty) range of x values. Let's call the lower and the upper boundaries of this range as l and u respectively. The value of u determines the responsibility region, using the same method explained in the equality case. (We can also use the value of l to determine the responsibility region.) If there is no special inequality of the form <, $\leq$ then u is $\infty$. To determine u, we select the inequalities of the form <, $\leq$ from the specified predicates. For instance, if all inequalities have the form le then minimum of the right hand of these inequalities is u. Suppose for a tuple of $T_2$ we have $C_{1k} \leq 200 \wedge C_{1k} \leq 100$, then the value of u is 100.

In the first specialized method, we must replace the access of the inner for preserving tuples with:
ACCESS $T_2$
where <ON clause> v u of tuple of $T_2$ is in Region i.e., we replace x with u. In the second specialized method, we must replace the access of the inner for preserving tuples with:
ACCESS $T_2$
where u of tuple of $T_2$ is in Region A NOT <ON clause>

The first operand of v is true for matching tuples of the inner. The second operand is true for the tuples that must be preserved. Note that the second operand may also be true for the matching tuples, hence the operands are not mutually exclusive.

If the inequalities are only of the form <, $\leq$, the second operand of v subsumes the first argument, hence the first operand and the v operator can be eliminated. Then, no change is needed in the specialized method 1. This simplification allows a better usage of indices on $T_2$, because the ACCESS predicate is simply a range predicate (does not contain OR). The same simplification can be achieved if all the inequality predicates are of the forms >, $\geq$. For this we must use the value of the variable l to determine the responsibility region. As explained before, a tuple of $T_2$ maps to a (possibly empty) range of x values, and the lower and upper boundaries of this range are the values of the variables l and u. Also, we had the option of using either values to determine the responsibility region.

If no join predicate is specified, i.e., either no predicate is specified or only $P_2$ is specified then we can add a special inequality predicate of the form: $C_{11} < \infty$ and use the above method.

Inequalities on any number of columns

We must use the general method. The reason for this is that the second condition of the specialized method does not hold in this case. Suppose we have the following variation of Query 1:

Query 4:

SELECT *
    FROM ls RIGHT JOIN cs
        ON    ( ls.ptype = cs.ptype AND
                ls.sales ≦ cs.sales AND
                ls.profit ≦ cs.profit
              )

Suppose we have the same database as the one used in the category 1 examples. In this case, table ls must be sorted on ptype, sales, and profit. Tuple 5 of cs matches tuple 1 of ls, and it does not match tuple 3 of ls. Tuple 3 of ls forms the responsibility region that tuple 5 of cs belongs to. Hence, the second condition of the specialized method does not hold.

Ordering

Some join methods, such as nested loop, merge scan (but not hash join) preserve the ordering of some of the input tables at the output. E.g., nested loop preserves the ordering of the outer table. Merge scan does the same, and further, preserves the ordering of the inner table (within the outer table) if the outer table does not have any duplicates. The general method, as mentioned before, loses these properties. However, the specialized method has the advantage of preserving orders. Specialized method 1 does not change the ordering properties of the join method which is used as an extension for. Specialized method 2 only preserves the ordering of the outer table. The reason for this is that it outputs the matched and preserved inner tuples separately, hence losing the order of the inner table.

Parallel Execution

Parallelism is the main technique employed to reduce response time of optimized queries. To obtain high degree of parallelism, the input tables are partitioned and many tasks are executed in parallel. Each task is associated with one or more partitions for executing a portion of the query. Since each task is performing a portion of the work, it completes its work in a proportionately less time. Assuming the load is balanced, and there are enough resources available to run the tasks, then the entire join is completed in a fraction of the sequential execution time. Due to skewed distribution of work, one or more tasks may become a bottleneck, hence taking much longer to complete. As a result, the response time improvement may be much less than that of the ideal case. Hence, the execution methods must be flexible to allow load balancing.

We first present a parallel version of the specialized method. Based on this, we present a parallel version of the general method.

In the parallel execution of an outer join it is possible for the same tuple to have a match in one task but not the others. Therefore, other tasks must not preserve the tuple. Also, an unmatched tuple must not be preserved several times by different tasks. A more naive approach requires the tasks to communicate with each other to convey the fact that a tuple has a match, or does not have a match at all, and in this case, elect a task to preserve the tuple. We will present an extension of the specialized method which requires no communication among different tasks. This has resulted in a much simpler and also a more efficient method. The idea behind this method is the same as the one used in the sequential case. In the sequential case, we wanted to preserve tuples of the inner table without remembering (e.g. lists of TIDs in the style of the general method) any information regarding the matching and preservation properties of a tuple. The counterpart of remembering some information translates to multi-task communication in the parallel case. Hence, using the same idea of the sequential method, we must be able to avoid inter-task communication. The parallel specialized method is as follows:

1. Partition $T_1$. Note that $T_1$ is ordered on $C_{11}, \ldots, C_1k\}$. Several contiguous partitions may have duplicate values for these columns.
2. Assign to a task a partition of $T_1$.
3. Run the tasks in parallel.
4. Each task executes the specialized method for the cursor positions associated with its partition. (This method does not make any assumption about partitioning of $T_2$. Hence, the optimizer is free to choose any access path to fetch the $T_2$ tuples. E.g., if the operation is a full natural outer join, and $T_1$ and $T_2$ are partitioned on the key ranges of the join column, then each task, associated with a partition of $T_1$, only needs to access the corresponding $T_2$ task. This is further optimized, if the corresponding $T_1$ and $T_2$ partitions are in the same node of a parallel machine.)

The key thing that makes this method work is the way the responsibility regions are defined. For a given tuple of $T_1$, its responsibility region depends on the values of that tuple and the values of columns of the next tuple, even if the next tuple belongs to the next partition. That is, the responsibility regions are defined exactly the same way as in the sequential case, and independent of the partitions. A given tuple of the outer table is handled by one task. Therefore, preservation of the outer tuples is done exactly like the sequential case.

The specialized methods read one tuple ahead as part of scan of the outer table to determine the responsibility region. Therefore, when a cursor reaches the end of a partition, it needs to read the first tuple of the next partition. An alternative is to give this tuple to each task at task start time. The last partition gets eof as the first tuple of its next partition.

The degree of parallelism is the same as the number of $T_1$ partitions (assuming balanced load). Degree of parallelism can be increased by parallel execution of the ACCESS of the inner table, as part of separate tasks. With this, the degree of parallelism can be up to the number of outer tasks times the number of inner tasks. Usually, such a high degree of parallelism is not needed.

For hash join, different hash buckets can be joined in parallel. Join of each bucket can also be done in parallel using the above method. This can be very beneficial if the join column is a frequent value in the outer or the inner table. In these cases, the hash buckets become very large and must be executed in parallel for acceptable response time reduction.

The output table is also partitioned, one partition per task. This method has the same order preserving properties as its sequential counterparts. Obviously, each task has the same order preserving properties, hence each partition of the output table has the same order as the sequential case. The columns of $T_1$ form the most significant and the columns of the inner, wherever applicable, form the least significant ordering columns. Since, the partitions of the outer table are ordered, and there is one task that outputs data for each outer partition, therefore the output partitions form the same order as the sequential case.

Handling of Skewed Load Distribution

As mentioned before, parallel execution methods must be flexible to allow tuning to avoid unbalanced loads among tasks. In this section, we explain the flexibilities this method provides for this purpose.

A task may have to do more work than others due to more work associated with $T_1$, or access of $T_2$ and application of join predicates. The work associated with $T_1$ may be skewed due to skewed distribution of number of tuples in each partition, or extra work needed to access a particular partition of $T_1$. The work associated with $T_2$ may be skewed due to skewed distribution of number of $T_2$ tuples that match an outer tuple, or the number of tuples that must be preserved when the cursor is positioned on an outer tuple. Nonuniform distribution of join column values usually cause such a skew. We consider several skew cases.

1. No or slightly skewed case:

If a task is overloaded, its $T_1$ partition can be reduced. Note that the method allows arbitrary partition sizes. Even duplicate tuples of the outer can be assigned to different tasks. At the extreme, there is only one tuple in $T_1$ partition and still its associated task is overloaded. We call this a highly skewed case. An example of this case is when the join column value is a frequent value in $T_2$.

2. Highly Skewed case:

For the tasks that fall in this category, we execute the ACCESS of $T_2$ in parallel as part of separate tasks. Therefore, there is a task associated with the partition of $T_1$ and associated with it there are many tasks that access $T_2$ and return data to the outer tasks. The rest of the work, i.e., application of join predicate, preservation and outputting of the results, must be done by the outer task. We can also do evaluation of the join predicate and preservation as part of the tasks that access $T_2$. It is unlikely that this amount of work can overload a task. If this happens, we call this very highly skewed case.

3. Very Highly Skewed (VHS) case:

To handle this case, we change the method as follows. For each VHS partition of $T_1$, partition $T_2$ and assign one task to each partition. Each task does the outer join independently. Each tuple of $T_1$ is handled by multiple tasks, and as a result it may be preserved multiple times. Note that each tuple of $T_2$ can only be preserved by one task, hence this problem does not arise. There are two ways to deal with the problem of multiple preservation of a $T_1$ tuple. One is to mark the preserved outer tuples as such, and also keep their TIDs with the output tuples. At the end, we sort the output of VHS tasks (which itself can be done in parallel) and eliminate duplicates of preserved tuples. This method has the overhead of an extra sort (only for the output of Vhs tasks). As a side effect, does not allow pipelining of the entire output to the next stage of query processing. The second solution is to output the tuples of $T_1$ that are preserved by VHS tasks in a separate place. Then sort that list, eliminate duplicates and output them to the user. This solution avoids the extra sort on all outputs of the VHS tasks. However, it loses the order preserving properties of solution 1.

Note that our parallel method can also be used for the regular join. For this, we just need to eliminate the logic associated with preservation of tuples. Also, ordered access of $T_1$ is not necessary. This depends on the join method used. E.g., merge scan requires ordered access.

Parallel execution of the general method is straightforward. The first part is parallel execution of a regular join. The second part also uses a merge join style, hence it can be executed using a parallel version of merge scan.

Application of Outer Join in Execution of Subqueries

Variations of the outer join methods significantly increase the performance of execution of subqueries (existential and universal (ALL)) in SQL. In this section, we describe two variations of outer join, called ERJOIN and ARJOIN. We show how these operators can be used to execute SQL subqueries. Then we modify the outer join methods described earlier to execute these operators.

For the purpose of our discussion, we generalize the syntax of subqueries in SQL. This is the syntax used in Starburst SQL. (see L. Haas, et al., Starburst Mid-Flight: As the Dust Clears, IEEE Transactions on Knowledge and Data Engineering, pages 143–160, March 1990). A variation of this syntax is being considered as part of ANSI/ISO Standard SQL.) This form subsumes all forms of existential/universal subqueries in SQL.

EXISTS (<table>, <predicate>)

The interpretation is exactly the same as for IN and ANY subqueries in the standard SQL except that the <predicate> is any general predicate, instead of only comparison operators such as =, >, etc. allowed for IN and ANY. Hence, the result is TRUE if there exists one tuple in <table> where <predicate> is TRUE. The result is FALSE if for all tuples of <table> the <predicate> is FALSE. Otherwise, the result is UNKNOWN. Likewise, we describe a general form of ALL subqueries.

ALL (<table>, <predicate>)

This has the same meaning as the SQL ALL, except that <predicate> is generalized (just as for EXISTS). We will use this later for universal quantifiers.

ERJOIN Technique

Suppose we have two tables T1 and T2. The existential predicate between the two can be written as:

SELECT T2.*

FROM T1 ERJOIN T2 ON (Q)

ERJOIN stands for Existential Right Join. We output T2 tuples where there exists a T1 tuple such that predicate Q is satisfied. ERJOIN differs from the regular join in that the regular join between T1 and T2 may produce multiple copies of a tuple of T2 in the output if multiple tuples of T1 match this tuple of T2. Same as regular join, it is important for optimization to be able to execute ERJOIN with T1 as the outer or the inner table. Similar to the outer join, execution of ERJOIN with T2 as outer is trivial. For each tuple of T2, if there is a matching T1, then we output the tuple of T2 (once). We stop scan of T1 as soon as a matching tuple is found. Similar to the outer join, the difficulty is when T2 is the inner table. Somehow, we must avoid creating duplicate copies of a tuple of T2 that matches with multiple tuples of T1. A similar problem (and solution) exists for doing outer join. Suppose we are doing a right outer join.

SELECT T1.*, T2.*

FROM T1 RIGHT JOIN T2 ON (Q)

Here, we have to output matching tuples of T1 and T2. Also tuples of T2 that do not match any T1 tuple are output with NULL values for T1 columns (this is called preserving unmatched tuples of T2). Further, each unmatched tuple of T1 must be preserved only once. This latter requirement is very similar to our ERJOIN requirement, which is to output a tuple of T2 only once, regardless of how many times it matches with T1 tuples. We use the responsibility region concept described earlier. In this method, each tuple of T2 is assigned a unique responsibility region, and each responsibility region is assigned to a tuple of T1. Only that tuple of T1 can do something special for that tuple of T2. In the outer join case, this special thing is to preserve the tuple. In our case, that something special is to output the tuple of T2 if it has a match in T1. Therefore, a tuple of T2 can only be output once, hence avoiding the problem of creating duplicates. For our case, we need to have a variant of the outer join method, where we change the predicates used in the outer join slightly, so that the matching tuples are output in the responsibility regions, and nowhere else. We keep the ON clause terminology for easier correspondence with the outer join. First observe that we are only using the efficient specialized outer join method (not the general one). Hence, ERJOIN can only be used where the specialized method qualifies. We want to put each T2 tuple which has a match into precisely one non-NULL responsibility region. We only access T2 tuples in responsibility regions, skipping the NULL responsibility regions. In both specialized methods 1 and 2, we modify the ACCESS of the inner to be conditional on non-NULL regions, and use the <ON clause> as a predicate.

TABLE 4

Figure 7:
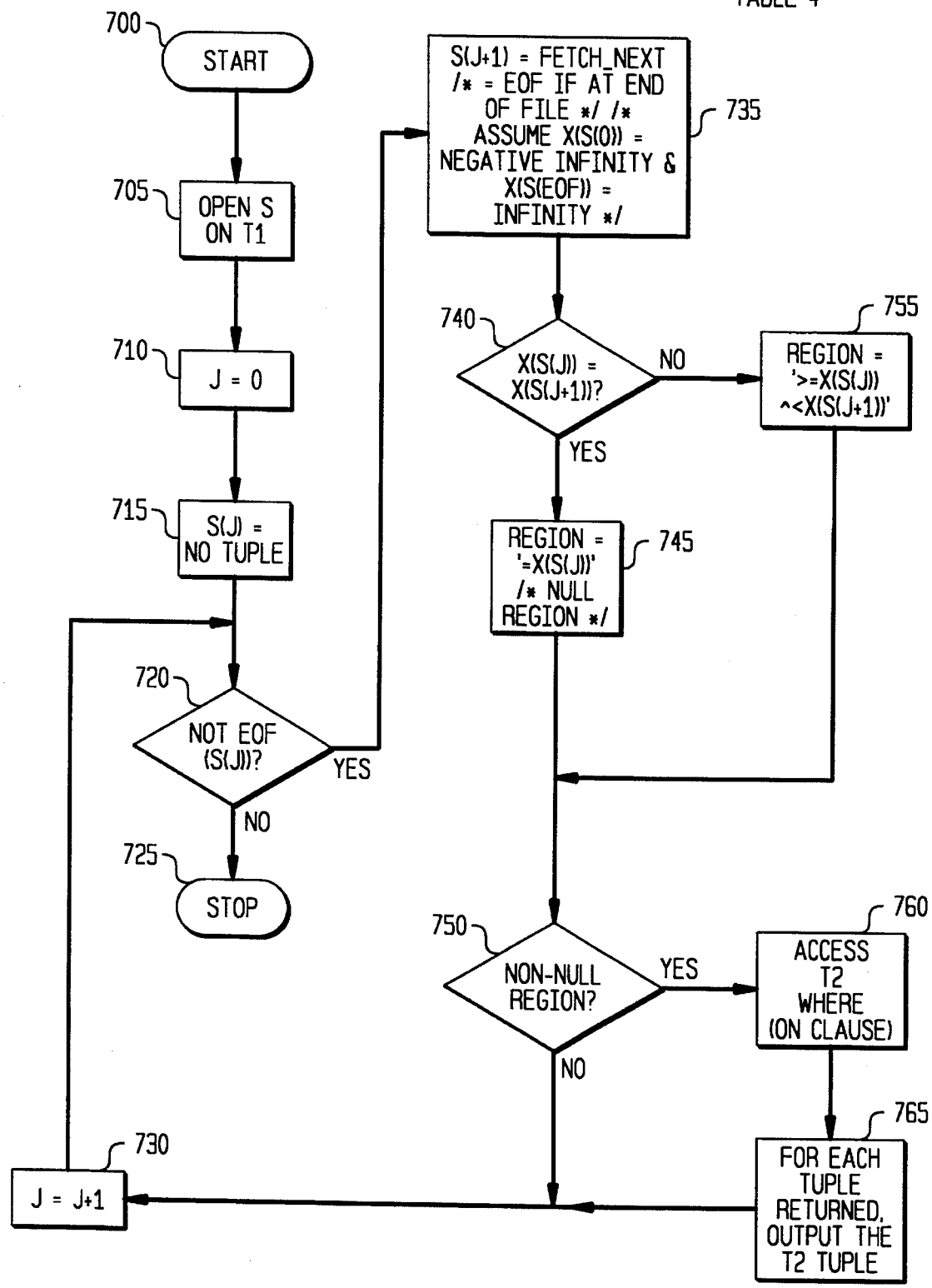
FIG. 7 is a process flow diagram illustrating the operations preferred in carrying out an alternative ERJOIN Specialized Method 1 embodiment of the present invention as described in Table 4.
Figure 8:
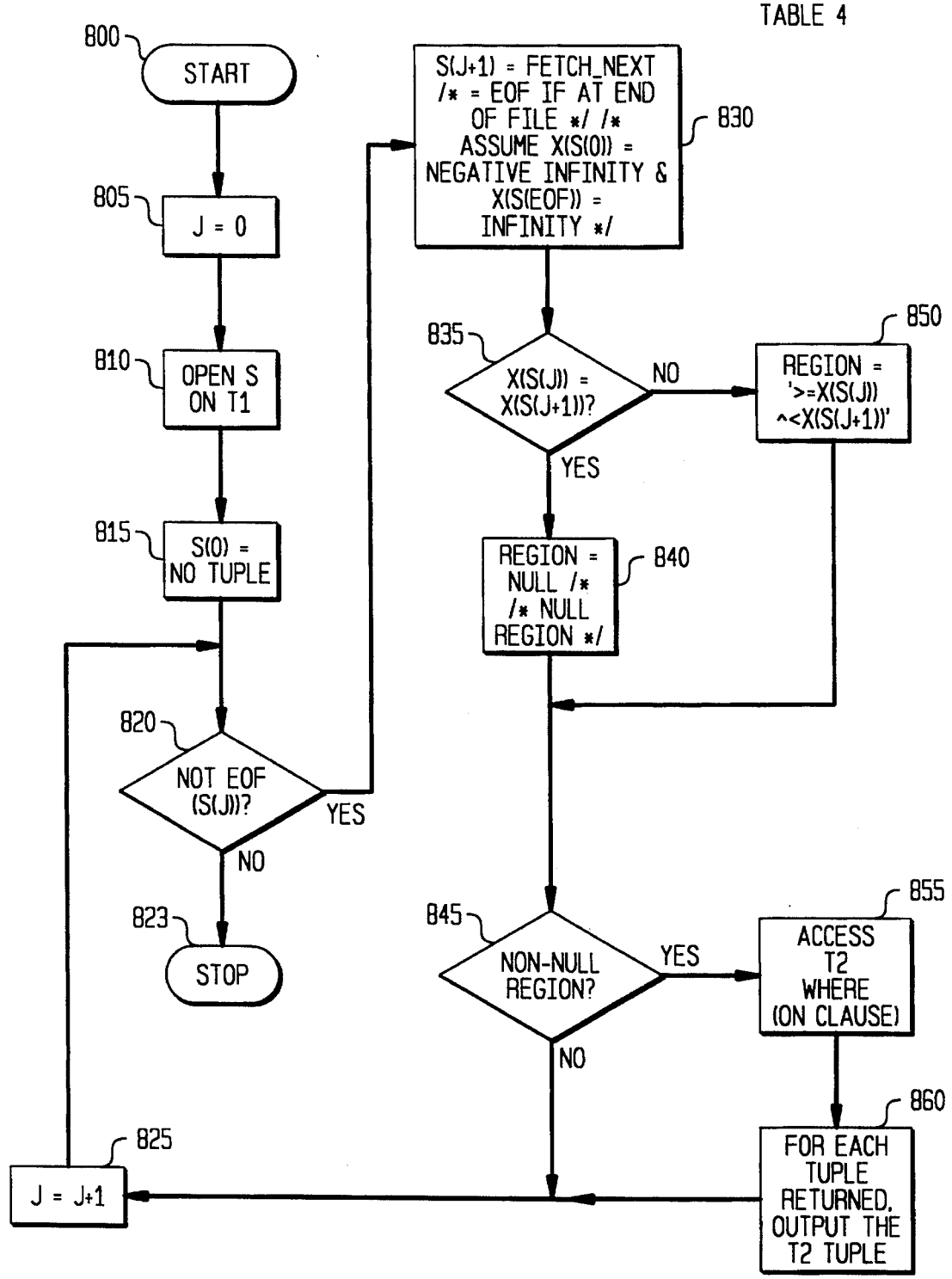
FIG. 8 is a process flow diagram illustrating the operations preferred in carrying out an alternative ERJOIN Specialized Method 2 embodiment of the present invention as described in Table 4.

|  | FIG. 7/FIG. 8 Reference Numerals |
|---|---|
| /*Changes for ERJOIN */ | |
| if (non-NULL region) | 750/845 |
| {(ACCESS T$_2$ where <ON clause>; | 760/855 |
| for each tuple returned | 765/860 |
| { output the T$_2$ tuple;} | 765/860 |
| skip the preservation part of the method; | |
| /*end of Changes for ERJOIN */ | |

Referring now to FIG. 7, FIG. 7 is a process flow diagram illustrating the operations preferred in carrying out an alternative ERJOIN Specialized Method 1 embodiment of the present invention as described in the above Table 4. The rightmost column of Table 4 entitled "FIG. 7/FIG. 8 Reference Numerals" indicates the reference numerals (first number in column before the "/") of those process blocks of FIG. 7 corresponding to the pseudocode statements of Table 4. This alternative embodiment of FIG. 7 results from replacing process steps 450, 455, 460, 465, 475, 480, 485, and 490 of FIG. 4 with the process steps 750, 760, and 765 of FIG. 7. Process steps 700, 705, 710, 715, 720, 725, 730, 735, 740, 745, and 755 of FIG. 7 correspond to process steps 400, 405, 410, 415, 420, 425, 430, 435, 440, 445, and 470, respectively, of FIG. 7.

Referring now to FIG. 8, FIG. 8 is a process flow diagram illustrating the operations preferred in carrying out an alternative ERJOIN Specialized Method 2 embodiment of the present invention as described in the above Table 4.

The rightmost column of Table 4 entitled "FIG. 7/FIG. 8 Reference Numerals" indicates the reference numerals (second number in column after the "/") of those process blocks of FIG. 8 corresponding to the pseudocode statements of Table 4. This alternative embodiment of FIG. 8 results from replacing process steps 650, 655, 660, 670, and 675 of FIG. 6 with the process steps 845, 855, and 860 of FIG. 8. Process steps 800, 805, 810, 815, 820, 825, 830, 835, 840, and 850 of FIG. 8 correspond to process steps 600, 605, 610, 620, 625, 630, 635, 640, 645, and 665, respectively, of FIG. 6.

ARJOIN Technique

ARJOIN stands for All (Universal) Right Join. This is very similar to what we had for ERJOIN, explained before. Suppose we have two tables T1 and T2. The universal predicate, in the form we discussed above is:

ALL (T, NOT (Q))

NOT (Q) is chosen, without loss of generality, for convenience of exposition. This can be written as:

SELECT T2.*

FROM T1 ARJOIN T2 ON (NOT(Q))

We output T2 tuples where for all T1 tuples, predicate Q is not satisfied. Further, we want T1 to be chosen as the outer table (the solution for the case where T1 is the inner table is already discussed). This problem exactly corresponds to the preservation part in the right outer join, where we preserve a tuple of the inner table if the ON clause is not satisfied for all tuples of the outer table. This property was observed in the paper by A. Rosenthal and D. Reiner (Extending the Algebraic Framework of Query Processing to Handle Outerjoins, supra). We can modify the corresponding outer join formulation:

SELECT T2.*

FROM T1 RIGHT JOIN T2 ON (Q) to perform the ARJOIN instead. Unlike RIGHT JOIN, which computes the regular join and preserves T2 tuples which have no T1 match (i.e., for all T1, Q is not satisfied), ARJOIN should only do the preservation part for T2. (In fact this extension to outer join is part of IBM's AS/400 query language, called outer join with the EXCEPT option. However, AS/400 does not provide any method to execute this with T1 as the outer. SQL does not really need this extension, because it can be expressed as a NOT EXISTS subquery. From the execution viewpoint, our methods will do the conversion). The changes needed in the methods are similar to those of ERJOIN. First we must skip the NULL responsibility regions. Second, we only need to handle the preserved tuples (i.e., ignore the matched tuples).

In method 2, we simply need to eliminate the part that accesses and outputs the matching tuples. (i.e., we should eliminate the line after: /*get the matching tuples*/. )

Figure 9:
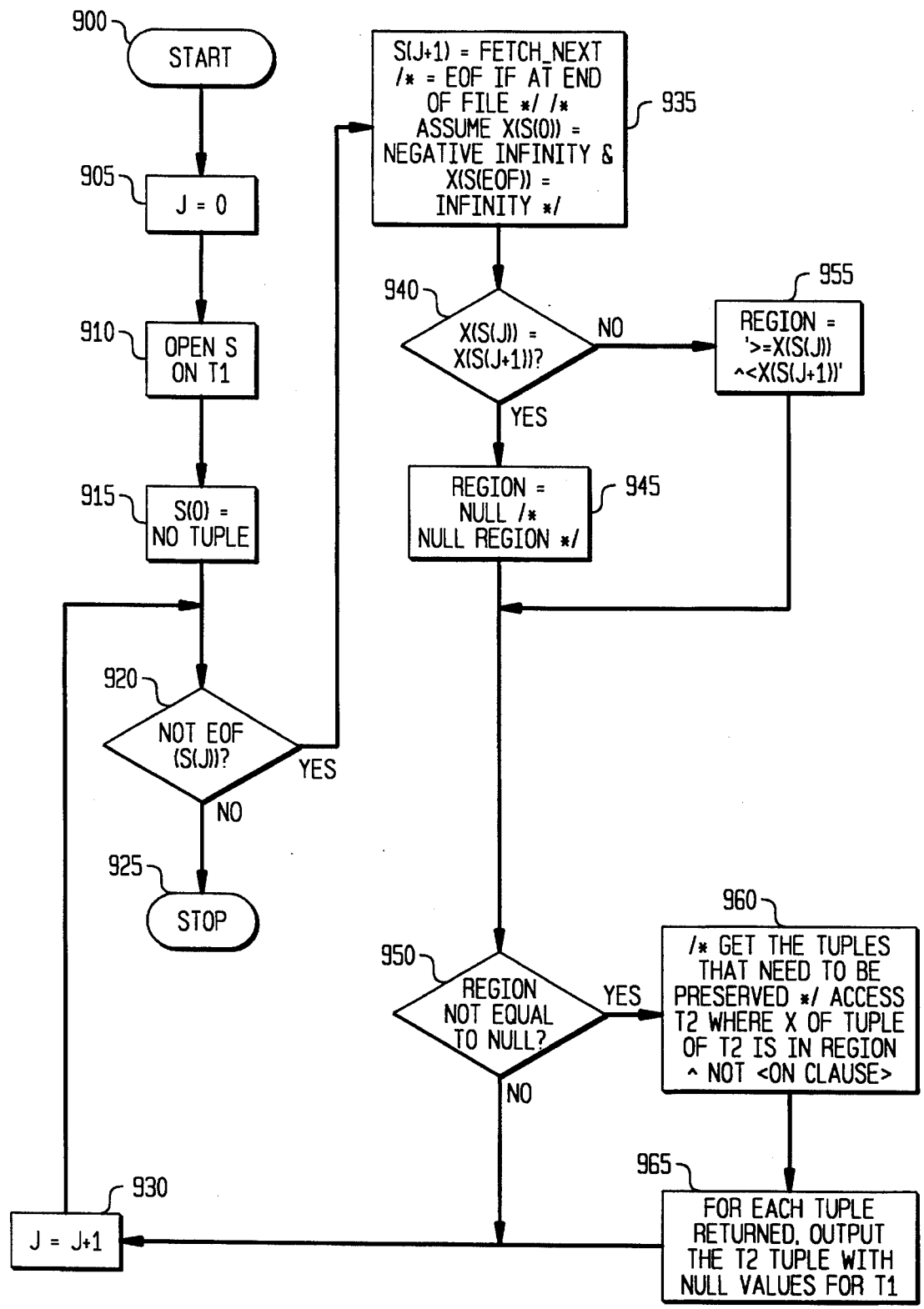
FIG. 9 is a process flow diagram illustrating the operations preferred in carrying out an alternative ARJOIN Specialized Method 2 embodiment of the present invention.

Referring now to FIG. 9, FIG. 9 is a process flow diagram illustrating the operations preferred in carrying out an alternative ARJOIN Specialized Method 2 embodiment of the present invention resulting from the above elimination of the part that accesses and outputs the matching tuples. This alternative embodiment of FIG. 9 results from deleting process steps 650 and 655 of FIG. 6. Process steps 900, 905, 910, 915, 920, 925, 930, 935, 940, 945, 950, 955, 960, and 965 of FIG. 9 correspond to process steps 600, 605, 610, 615, 620, 625, 630, 635, 640, 645, 660, 665, 670, and 675, respectively, of FIG. 6.

In method 1, we must eliminate accessing the matching inner tuples. That is, we should change ACCESS of the inner table to be conditional on non-NULL regions, and not accessing the matching tuples.

TABLE 5

| Specialized Method 1 - Sequential Version | FIG. 10 Reference Numerals |
|---|---|
|  | 1000 |
| /*In the following, s is a cursor on T$_1$ */ | |
| open s on T$_1$; | 1005 |
| j= 0; | 1010 |
| s$_j$= no tuple; | 1015 |
| while ( not eof (s$_j$) ) | 1020 |

TABLE 5-continued

| Specialized Method 1 - Sequential Version | FIG. 10 Reference Numerals |
| --- | --- |
| {<br>   $s_{j+1}$ = fetch_next; /* = eof if at end of file */ | 1035 |
|    /*assume $X(s_0) = -\infty$ and $X(s_{eof}) = \infty$ */ | 1035 |
|    if ($X(s_j) = X(s_{j+1})$ )) | 1040 |
|       { Region = ' = $X(s_j)$ '; /*NULL Region */ } | 1045 |
|    else | 1040 |
|       { Region = '$\geq X(s_j) \wedge < X(s_{j+1})$. '; } | 1065 |
|    /*Changes for ARJOIN*/ | |
|    if (non-NULL region) | 1050 |
|       {ACCESS $T_2$ | 1055 |
|          where x of tuple of $T_2$ is in Region A. NOT <ON clause>; | 1055 |
|          for each tuple returned | 1060 |
|             { output the $T_2$ tuple with NULL values for $T_1$;} | 1060 |
|       } | |
|    /*end of Changes for ARJOIN */ | |
|    j = j+1; | 1030 |
| } | 1025 |

Referring now to FIG. 10, FIG. 10 is a process flow diagram illustrating the operations preferred in carrying out an alternative ARJOIN Specialized Method 1 embodiment of the present invention as described in the above Table 5. The rightmost column of Table 5 entitled "FIG. 10 Reference Numerals" indicates the reference numerals of those process blocks of FIG. 10 corresponding to the pseudocode statements of Table 5. This alternative embodiment of FIG. 10 results from changing ACCESS of the inner table to be conditional on non-NULL regions, and not accessing the matching tuples.

Using the foregoing specifications the described methods may be implemented using standard well known programming techniques. The resulting program(s) may be stored on disk, diskettes, memory cards, ROM or any other memory device. For execution of the database the program may be copied into the RAM of the computer. One skilled in the art of computer science will easily be able to combine the software created as described with appropriate general purpose or special purpose computer hardware to create a database machine and a database system.

While the preferred embodiment of the present invention has been defined in detail, it should be apparent that modifications and adaptations to that embodiment may occur to one skilled in the art without departing from the scope of the present invention as set forth in the following claims.

What is claimed is:

1. A program storage device readable by a machine, tangibly embodying a program of instructions executable by the machine to perform method steps for performing a right outer join with specified join predicates in a database system having an inner table and an outer table, each of which tables is composed of a plurality of tuples having multiple columns, the outer table being ordered or indexed in a sorted sequence on a selected set of columns, said method steps comprising:

determining a plurality of responsibility regions in the inner table using a selected set of columns such that every tuple in the inner table belongs to one and only one responsibility region; and processing each responsibility region by outputting all tuples of the inner table which belong to the responsibility region, wherein if an inner tuple and an outer tuple match by satisfying all the specified join predicates, outputting the outer tuple with the inner tuple, and if the inner and outer tuples do not match, outputting null values for the outer tuple with the inner tuple.

2. The program storage device of claim 1, wherein the determining step further comprises the step of defining an initial responsibility region which contains all tuples of the inner table which have values of a selected set of columns less than the value of the selected set of columns for a first tuple of the outer table.

3. The program storage device of claim 1, wherein the determining step further comprises the step of defining a final responsibility region which contains all tuples of the inner table which have values of a selected set of columns equal to or greater than the value of the selected set of columns for a last tuple of the outer table.

4. The program storage device of claim 1, wherein the processing step further comprises the step of outputting all tuples of the inner table which have values of a selected set of columns less than the value of the selected set of columns for a first tuple of the outer table.

5. The program storage device of claim 1, wherein the processing step further comprises the step of outputting all tuples of the inner table which have values of a selected set of columns equal to or greater than the value of the selected set of columns for a last tuple of the outer table.

6. The program storage device of claim 1, wherein the determining step further comprises the steps of:

sequencing through the tuples in the outer table referencing a current tuple and a next tuple and for each unique set of column values in the outer table, other than that of a last tuple, assigning one of the plurality of responsibility regions to include a set of tuples from the inner table which corresponds to all tuples in the inner table which have values of the selected set of columns greater than or equal to the value of the selected set of columns for the current tuple of the outer table and less than the value of the specified set of columns for the next tuple of the outer table; and for the last tuple in the outer table, assigning a last responsibility region to include all tuples from the inner table which have not been assigned to any other one of the plurality of responsibility regions.

7. The program storage device of claim 1, wherein the processing step further comprises the steps of:

sequencing through the tuples in the outer table referencing a current tuple and a next tuple and for each unique set of column values in the outer table, other than that of a last tuple, accessing a set of tuples from the inner table which corresponds to all tuples in the inner table which have values of the selected set of columns greater than or equal to the value of the selected set of columns for the current tuple of the outer table and less than the value of the specified set of columns for the next tuple of the outer table; and for the last tuple in the outer table, accessing a set of tuples of the inner table which corresponds to all tuples in the inner table which have values of the selected set of columns greater than or equal to the value of the selected set of columns for the last tuple of the outer table.

8. A program storage device readable by a machine, tangibly embodying a program of instructions executable by the machine to perform method steps for performing an existential right join with specified join predicates in a database system having an inner table and an outer table, each of which tables are composed of a plurality of tuples having multiple columns, the outer table being ordered or indexed in a sorted sequence on a selected set of columns, said method steps comprising:

determining a plurality of responsibility regions in the inner table using a selected set of columns such that every tuple in the inner table belongs to one and only one responsibility region; and processing each non-null responsibility region by outputting all tuples of the inner table which belong to the non-null responsibility region, wherein if an inner tuple and an outer tuple match by satisfying all the specified join predicates, outputting the inner tuple once.

9. The program storage device of claim 8, wherein the determining step further comprises the steps of:

sequencing through the tuples in the outer table referencing a current tuple and a next tuple and for each unique set of column values in the outer table, other than that of a last tuple, assigning one of the plurality of responsibility regions to include a set of tuples from the inner table which corresponds to all tuples in the inner table which have values of the selected set of columns greater than or equal to the value of the selected set of columns for the current tuple of the outer table and less than the value of the specified set of columns for the next tuple of the outer table; and for the last tuple in the outer table, assigning a last responsibility region to include all tuples from the inner table which have not been assigned to any other one of the plurality of responsibility regions.

10. The program storage device of claim 8, wherein the processing step further comprises the steps of:

sequencing through the tuples in the outer table referencing a current tuple which is associated with one of the non-null responsibility regions and accessing a set of tuples from the inner table which corresponds to all tuples in the inner table which have values of the selected set of columns equal to the value of the selected set of columns for the current tuple of the outer table.

11. A program storage device readable by a machine, tangibly embodying a program of instructions executable by the machine to perform method steps for performing an all right join with specified join predicates in a database system having an inner table and an outer table, each of which tables are composed of a plurality of tuples having multiple columns, the outer table being ordered or indexed in a sorted sequence on a selected set of columns, said method steps comprising:

determining a plurality of responsibility regions in the inner table using a selected set of columns such that every tuple in the inner table belongs to one and only one responsibility region; and processing each non-null responsibility region by outputting all tuples of the inner table which belong to the non-null responsibility region, wherein if an inner tuple and an outer tuple do not match by not satisfying all the specified join predicates, outputting the inner tuple.

12. The program storage device of claim 11, wherein the determining step further comprises the step of defining an initial non-null responsibility region which contains all tuples of the inner table which have values of a selected set of columns less than the value of the selected set of columns for a first tuple of the outer table.

13. The program storage device of claim 11, wherein the determining step further comprises the step of defining a final non-null responsibility region which contains all tuples of the inner table which have values of a selected set of columns equal to or greater than the value of the selected set of columns for a last tuple of the outer table.

14. The program storage device of claim 11, wherein the processing step further comprises the step of outputting all tuples of the inner table which have values of a selected set of columns less than the value of the selected set of columns for a first tuple of the outer table.

15. The program storage device of claim 11, wherein the processing step further comprises the step of outputting all tuples of the inner table which have values of a selected set of columns greater than and not equal to the value of the selected set of columns for a last tuple of the outer table.

16. The program storage device of claim 11, wherein the determining step further comprises the steps of:

sequencing through the tuples in the outer table referencing a current tuple and a next tuple and for each unique set of column values in the outer table, other than that of a last tuple, assigning the non-null responsibility regions to include a set of tuples from the inner table which corresponds to all tuples in the inner table which have values of the selected set of columns greater than or equal to the value of a selected set of columns for the current tuple of the outer table and less than the value of the specified set of columns for the next tuple of the outer table; and for the last tuple in the outer table, a last non-null responsibility region to include all tuples from the inner table which have not been assigned to any other of the non-null responsibility regions.

17. The program storage device of claim 11, wherein the processing step further comprises the steps of:

sequencing through the tuples in the outer table referencing a current tuple and a next tuple and for each unique set of column values in the outer table, other than that of a last tuple, accessing a set of tuples from the inner table which corresponds to all tuples in the inner table which have values of the selected set of columns greater than and not equal to the value of the selected set of columns for the current tuple of the outer table and less than the value of the specified set of columns for the next tuple of the outer table; and for the last tuple in the outer table, accessing a set of tuples of the inner table which corresponds to all tuples in the inner table which have values of the selected set of columns greater than and not equal to the value of the selected set of columns for the last tuple of the outer table.

18. A computer program product for use with a database system having means for performing a right outer join, an existential right join, and an all right join, with specified join predicates, on an inner table and an outer table, each table composed of a plurality of tuples having multiple columns, the outer table being ordered or indexed in a sorted sequence on a selected set of columns, said computer program product comprising:

a computer usable medium having a computer readable program code means embodied in said medium for performing the join operations, said computer readable program code means comprising:

computer readable first program code means for causing a computer to determine a plurality of responsibility regions in the inner table using the selected set of columns such that every tuple in the inner table belongs to one and only one responsibility region; and computer readable second program code means for causing said computer to process each responsibility region by outputting all tuples of the inner table which belong to the responsibility region, wherein for the right outer join, if an inner tuple and an outer tuple match by satisfying all the specified join predicates, outputting the outer tuple with the inner tuple, and if the inner and outer tuples do not match, outputting null values for the outer tuple with the inner tuple, for the existential right join, if the inner and outer tuples match, outputting the inner tuple once, and for the all right join, if the inner and outer tuples do not match, outputting the inner tuple.

19. The computer program product of claim 18, wherein said computer readable second program code means comprises:

means for sequencing through the tuples in the outer table referencing a current tuple and a next tuple and for each unique set of column values in the outer table, other than that of a last tuple, assigning one of the plurality of responsibility regions to include a set of tuples from the inner table which corresponds to all tuples in the inner table which have values of the selected set of columns greater than or equal to the value of the selected set of columns for the current tuple of the outer table and less than the value of the specified set of columns for the next tuple of the outer table; and means for assigning a last responsibility region, associated with the last tuple in the outer table, to include all tuples from the inner table which have not been assigned to any other one of the plurality of responsibility regions.

20. The computer program product of claim 18, wherein said computer readable first program code means further comprises means for defining both null and non-null responsibility regions.

21. The computer program product of claim 20, wherein:

the join operation to be performed is an existential right join; and said computer readable second program code means further comprises means for accessing the inner table only for non-null responsibility regions.

22. The computer program product of claim 20, wherein:

the join operation to be performed is an all right join having an ON clause; and said computer readable second program code means further comprises means for accessing the inner table only for non-null responsibility regions and only for tuples not matched by the ON clause.

\* \* \* \* \*